(12) United States Patent
Davis et al.

(10) Patent No.: US 12,554,224 B2
(45) Date of Patent: Feb. 17, 2026

(54) CROWN FOR AN ELECTRONIC WATCH

(71) Applicant: Apple Inc., Cupertino, CA (US)

(72) Inventors: Richard A. Davis, San Carlos, CA (US); David D. Dashevsky, San Jose, CA (US)

(73) Assignee: Apple Inc., Cupertino, CA (US)

( * ) Notice: Subject to any disclaimer, the term of this patent is extended or adjusted under 35 U.S.C. 154(b) by 250 days.

(21) Appl. No.: 18/126,274

(22) Filed: Mar. 24, 2023

(65) Prior Publication Data

US 2024/0319672 A1    Sep. 26, 2024

(51) Int. Cl.
*G04B 3/04* (2006.01)
*G04G 21/02* (2010.01)
*G04G 21/08* (2010.01)

(52) U.S. Cl.
CPC ........... *G04B 3/046* (2013.01); *G04G 21/025* (2013.01); *G04G 21/08* (2013.01)

(58) Field of Classification Search
CPC ...... G04B 3/046; G04G 21/025; G04G 21/08; G04G 17/00; G04G 21/00; G04C 3/005; G04C 3/004; G04C 3/008
See application file for complete search history.

(56) References Cited

U.S. PATENT DOCUMENTS

| | | | |
|---|---|---|---|
| 4,203,280 A | 5/1980 | Ziegler | |
| 7,557,795 B2 | 7/2009 | Kong et al. | |
| 7,920,249 B2 | 4/2011 | Heinks et al. | |
| 9,010,945 B2 | 4/2015 | Vasylyev | |
| 9,453,939 B2 | 9/2016 | Tortora et al. | |
| 9,535,501 B1 | 1/2017 | Moussette et al. | |
| 9,547,280 B2 | 1/2017 | Born et al. | |
| 9,638,587 B2 | 5/2017 | Marquas et al. | |
| 9,753,436 B2 | 9/2017 | Ely et al. | |
| 9,851,613 B2 | 12/2017 | Noble et al. | |
| 9,952,558 B2 | 4/2018 | Ely | |
| 9,971,407 B2 | 5/2018 | Holenarsipur et al. | |
| 10,019,097 B2 | 7/2018 | Ely et al. | |

(Continued)

FOREIGN PATENT DOCUMENTS

| | | |
|---|---|---|
| AU | 2007313960 | 5/2008 |
| CH | 706101 | 8/2013 |

(Continued)

*Primary Examiner* — Edwin A. Leon
(74) *Attorney, Agent, or Firm* — Brownstein Hyatt Farber Schreck, LLP

(57) ABSTRACT

An electronic watch may include a housing defining a side wall, a display, a front cover positioned over the display, and an input system configured to receive a rotational input and a translational input. The input system may include a crown including a knob external to the housing and a rotor coupled to the knob and configured to rotate in response to the rotational input and translate in response to the translational input. The input system may further include a first laser module configured to direct a first laser beam onto the rotor and receive first reflected light from the rotor, a second laser module configured to direct a second laser beam onto the rotor and receive second reflected light from the rotor. The electronic watch may further include a processing system coupled to the first and second laser modules and configured to determine a parameter of the rotational input.

20 Claims, 20 Drawing Sheets

(56) References Cited

U.S. PATENT DOCUMENTS

| | | |
|---|---|---|
| 10,048,802 B2 | 8/2018 | Shedletsky et al. |
| 10,061,399 B2 | 8/2018 | Bushnell et al. |
| 10,145,711 B2 | 12/2018 | Boonsom et al. |
| 10,203,662 B1 | 2/2019 | Lin et al. |
| 10,222,756 B2 | 3/2019 | Ely et al. |
| 10,241,593 B2 | 3/2019 | Chen et al. |
| 10,503,271 B2 | 12/2019 | Ely et al. |
| 10,599,101 B2 | 3/2020 | Rothkopf et al. |
| 10,610,157 B2 | 4/2020 | Pandya et al. |
| 11,036,318 B2 | 6/2021 | Kuboyama |
| 11,194,298 B2 | 12/2021 | Roach et al. |
| 11,432,766 B2 | 9/2022 | Pandya et al. |
| 11,561,515 B2 | 1/2023 | Beyhs |
| 11,644,800 B2 | 5/2023 | Holenarsipur et al. |
| 11,674,825 B2 | 6/2023 | Li et al. |
| 11,754,981 B2 | 9/2023 | Perkins |
| 12,092,996 B2 | 9/2024 | Herrera et al. |
| 12,105,480 B2 | 10/2024 | Perkins et al. |
| 12,189,347 B2 | 1/2025 | Davis et al. |
| 2009/0025872 A1 | 1/2009 | Nilsen et al. |
| 2018/0364815 A1* | 12/2018 | Moussette ............. G06F 3/0362 |
| 2019/0278232 A1* | 9/2019 | Ely ..................... G04C 3/004 |
| 2019/0317454 A1 | 10/2019 | Holenarsipur et al. |
| 2019/0391539 A1* | 12/2019 | Perkins ................. G04C 3/008 |
| 2021/0089136 A1 | 3/2021 | Hossain et al. |
| 2021/0199475 A1 | 7/2021 | Dantler et al. |
| 2023/0258479 A1 | 8/2023 | Li et al. |
| 2023/0273572 A1 | 8/2023 | Holenarsipur et al. |

FOREIGN PATENT DOCUMENTS

| | | |
|---|---|---|
| CN | 101641663 | 2/2010 |
| CN | 205121417 | 3/2016 |
| CN | 205721636 | 11/2016 |
| CN | 106557218 | 4/2017 |
| CN | 206147524 | 5/2017 |
| CN | 206209589 | 5/2017 |
| CN | 107122088 | 9/2017 |
| CN | 107966895 | 1/2020 |
| KR | 10-2016-0017070 | 2/2016 |
| KR | 10-2017-0106395 | 9/2017 |
| KR | 10-2020-0027010 | 3/2020 |
| KR | 10-2023-0012983 | 1/2023 |
| WO | WO 10/001299 | 1/2010 |
| WO | WO 14/200766 | 12/2014 |
| WO | WO 15/122885 | 8/2015 |
| WO | WO 16/196171 | 12/2016 |
| WO | WO 16/208835 | 12/2016 |
| WO | WO 18/236553 | 12/2018 |

* cited by examiner

CROWN FOR AN ELECTRONIC WATCH

FIELD

The described embodiments relate generally to electronic devices, and more particularly to a crown for a wearable electronic device.

BACKGROUND

Electronic devices frequently use physical input devices to facilitate user interaction. For example, buttons, keys, dials, and the like can be physically manipulated by users to control operations of the device. Physical input devices may use various types of sensing mechanisms to translate the physical manipulation to signals usable by the electronic device. For example, buttons and keys may use collapsible dome switches to detect presses, while dials and other rotating input devices may use encoders or resolvers to detect rotational movements.

SUMMARY

An electronic watch may include a housing defining a side wall, a display, a front cover positioned over the display, and an input system configured to receive a rotational input and a translational input. The input system may include a crown including a knob external to the housing and a rotor coupled to the knob and configured to rotate in response to the rotational input and translate in response to the translational input. The input system may further include a first laser module configured to direct a first laser beam onto the rotor and receive first reflected light from the rotor, a second laser module configured to direct a second laser beam onto the rotor and receive second reflected light from the rotor. The electronic watch may further include a processing system coupled to the first laser module and the second laser module and configured to determine a parameter of the rotational input based at least in part on first information from the first laser module and second information from the second laser module, and a parameter of the translational input based at least in part on third information from the first laser module and fourth information from the second laser module.

The input system may be further configured to receive a pivotal input, and the processing system may be further configured to determine a parameter of the pivotal input based at least in part on fifth information from the first laser module and sixth information from the second laser module. The first laser beam may have a first angle of incidence on the rotor and the second laser beam may have a second angle of incidence on the rotor, the second angle of incidence different than the first angle of incidence. The first laser beam may have a first angle of incidence on the rotor, and the second laser beam may have a second angle of incidence on the rotor, the second angle of incidence equal to the first angle of incidence.

The electronic watch may further include biometric sensing circuitry, the crown may further include a conductive shaft conductively coupling the knob to the biometric sensing circuitry, and the biometric sensing circuitry may determine biometric information of a user based at least in part on a voltage detected at the knob.

The first information from the first laser module may be based at least in part on an interference between the first laser beam and the first reflected light. The electronic watch may further include a beam-directing structure positioned over the first laser module and the second laser module and configured to direct the first laser beam along a first beam path and to direct the second laser beam along a second beam path different from the first beam path.

A wearable electronic device may include a housing having a side wall, a crown including a shaft assembly extending along a shaft axis, a knob coupled to the shaft assembly and defining an axial end surface, and a peripheral surface extending about the axial end surface and configured to receive a rotational input that results in a rotation of the crown and a radial input that results in a pivotal of the crown about a shaft pivot. The crown may also include a rotor coupled to the shaft assembly. The wearable electronic device may also include a first laser module configured to direct a first laser beam onto the rotor and receive first reflected light from the rotor, a second laser module configured to direct a second laser beam onto the rotor and receive second reflected light from the rotor, and a processing system coupled to the first laser module and the second laser module and configured to determine a parameter of the rotation of the crown, and a parameter of the pivotal of the crown. The first laser beam may be parallel to the second laser beam.

The shaft assembly may extend into the housing through a hole, and the wearable electronic device may further include a sealing member positioned between the shaft assembly and a surface of the hole. The sealing member may define the shaft pivot.

The rotor may define an outer peripheral surface, the first laser beam may be incident at a first location of the outer peripheral surface, and the second laser beam may be incident at a second location of the outer peripheral surface different from the first location. The outer peripheral surface may be conical.

The axial end surface may be configured to receive an axial input that results in a translation of the crown, and the processing system may be further configured to determine a parameter of the translation of the crown. The processing system may be configured to determine the parameter of the translation of the crown based at least in part on information from at least one of the first laser module or the second laser module.

An electronic watch may include a housing, a crown configured to receive a rotational input and a translational input and including a knob positioned along a side of the housing, and a rotor coupled to the knob and defining a sensing surface. The electronic watch may further include a first laser module configured to direct a first laser beam onto the rotor and configured to receive first reflected light from the rotor, a second laser module configured to direct a second laser beam onto the rotor and receive second reflected light from the rotor, the second laser beam non-parallel with the first laser beam, and a processing system coupled to the first laser module and the second laser module and configured to determine a parameter of the rotational input based at least in part on a first interference between the first laser beam and the first reflected light and a second interference between the second laser beam and the second reflected light and a parameter of the translational input based at least in part on a third interference between the first laser beam and the first reflected light and a fourth interference between the second laser beam and the second reflected light.

The first laser beam may have a first angle of incidence on the rotor, and the second laser beam may have a second angle of incidence on the rotor, the second angle of incidence equal to the first angle of incidence. The first laser beam may be incident on the rotor at a first radial distance from a rotational axis of the rotor, and the second laser beam may be incident on the rotor at a second radial distance from the rotational axis of the rotor, the second radial distance equal to the first radial distance.

For a rotational input in a rotation direction, the first interference between the first laser beam and the first reflected light may indicate a movement having a first speed and a first direction, and the second interference between the second laser beam and the second reflected light may indicate a movement having a second speed equal to the first speed and a second direction different from the first direction.

The electronic watch may further include biometric sensing circuitry, the crown may further include a conductive shaft conductively coupling the knob to the biometric sensing circuitry, and the biometric sensing circuitry determines biometric information of a user based at least in part on a voltage detected at the knob.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
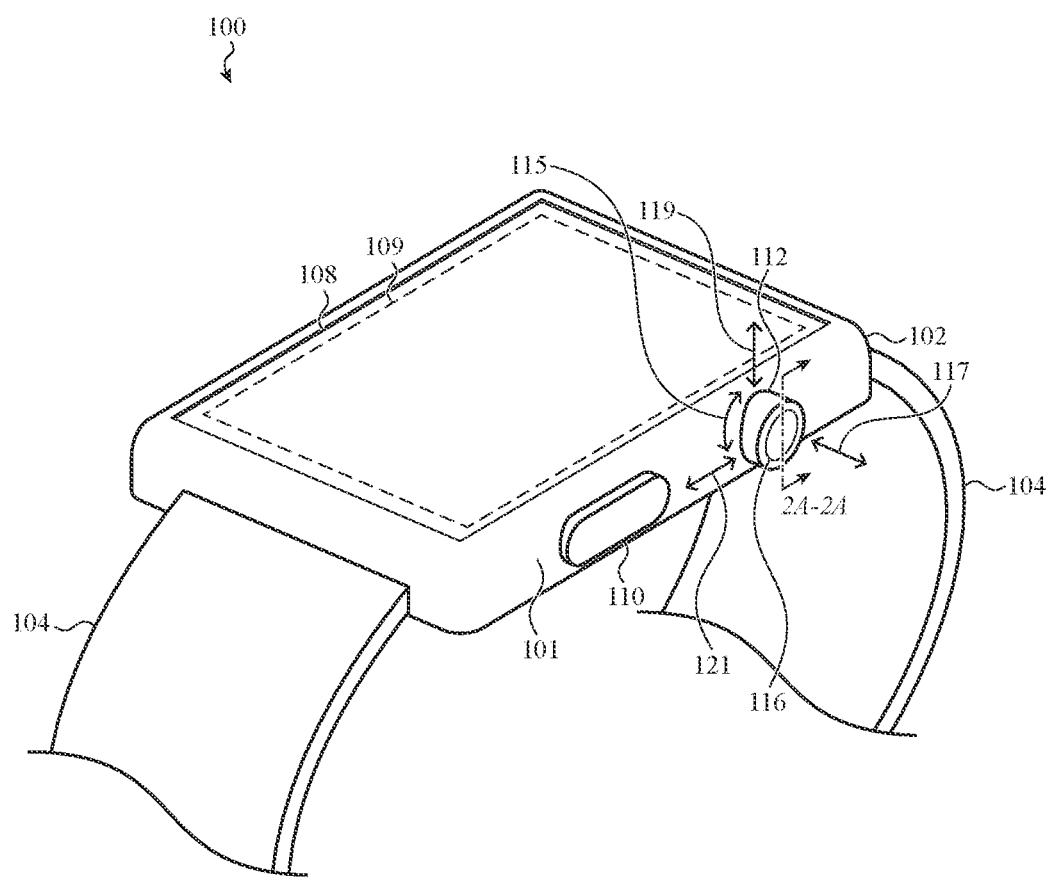
FIGS. 1A-1B depict an example wearable electronic device.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to a crown of a wearable electronic device, such as an electronic watch (also referred to as a "smart watch" or simply a "watch"), and more particularly to a crown that can be manipulated by a user to provide inputs to the device. For example, the crown may accept rotational inputs, by which a user spins, twists, turns, or otherwise rotates the crown about a rotation axis. Rotational inputs may be used to control operations of the device. For example, a rotational input may modify a graphical display of the device in accordance with a direction of rotation of the crown, such as to scroll through lists, select or move graphical objects, move a cursor among objects on a display, or the like. The crown may also accept translational inputs, by which a user pushes or presses on the end of the crown (e.g., along, or parallel to, the rotation axis). Translational inputs may be used to indicate a selection of an item displayed on a display, change a display mode (e.g., to activate a display), change between or among graphical interface modes, or the like. The crown may also accept pivotal or "toggle" inputs, in which the user pushes or presses on an outer peripheral surface of the crown (e.g., applying a radial force to the crown). Pivotal inputs may be used to indicate a selection of an item displayed on a display, initiate a scrolling mode, or the like. In some cases, pivotal inputs may be configured to produce the same or similar input functions as a translational input or a rotational input, and as such may be used in place of the translational or rotational input capabilities in some circumstances (e.g., when it is difficult or cumbersome for a user to perform a rotational or translational input).

In some cases, a crown may also act as a contact point for a sensor, such as a biometric sensor, of the device. For example, a smart watch may include any or all of a heart rate sensor, an electrocardiograph sensor, a thermometer, a photoplethysmograph sensor, a fingerprint sensor, or the like, all of which are examples of biometric sensors that measure or detect some aspect of a user's body. Such sensors may require direct contact with the user's body, such as via a finger. Accordingly, the crown may include an external component, such as a window, electrode, or the like, that a user may touch in order to allow the biometric sensor to take a reading or measurement. In some cases, electrical signals may be transmitted through the crown to internal sensors via a conductive path defined by and/or through the crown.

In order to respond to rotational, translational, or pivotal inputs applied to a crown, one or more sensing systems are used to sense the motions of the crown components that result from these inputs. In conventional devices, separate sensing systems may be used to detect these motions. For example, an optical sensor may be used to detect rotational inputs, while a collapsible dome switch may be used to detect translational movements and another collapsible dome switch may be used to detect pivotal inputs. In some cases, each sensing system is only capable of or configured to sense one type of motion, thus resulting in multiple sensing systems being used to detect the various input types. In wearable devices (and modern electronic devices more generally) that provide many sophisticated electronic systems, such as wireless communications systems, touchscreen displays, GPS receivers, and the like, internal volume is at a premium. Accordingly, reducing the space occupied by the various sensing systems and other crown-based components can result in greater space for other components (including, for example, a larger battery to provide longer battery life).

Described herein are sensing systems that sense or detect multiple different types of crown inputs with a single laser-based sensing system. For example, a laser-based system as described herein may use laser emitters, such as vertical-cavity surface-emitting lasers (VCSELs), to direct a laser beam (e.g., a beam of coherent light) onto a component of the crown that moves in response to the rotational, translational, and pivotal inputs. The laser beams may be aimed at the moving component in such a way that some of the emitted light is reflected back from the component into the laser emitter(s), and the effect of the reflected light on the laser emitter(s) may be used to determine any of the speed, distance, or direction of a motion of the component. More particularly, as described herein, the laser beams may be aimed at the moving component at angles that produce a detectable interference effect on the emitted laser beam when the component moves in a direction that is intended to be detected. The sensing systems may detect the effect of the interference (e.g., using self-mixing laser interferometry) to detect the motion of the moving component.

The sensing systems described herein may use multiple laser beams on the moving component in order to capture additional information about the various inputs. For example, multiple laser beams may be used to disambiguate between rotational and translational inputs, or between rotational and pivotal inputs. Laser beams may also be directed onto different components or surfaces entirely in order to capture different input movements.

FIG. 1A depicts an electronic device 100 (also referred to herein simply as a device 100). The device 100 is depicted as a watch, though this is merely one example embodiment of an electronic device, and the concepts discussed herein may apply equally or by analogy to other electronic devices, including mobile phones (e.g., smartphones), tablet computers, notebook computers, head-mounted displays, headphones, earbuds, digital media players (e.g., mp3 players), or the like.

The device 100 includes a housing 102 and a band 104 coupled to the housing. The housing 102 may at least partially define an internal volume in which components of the device 100 may be positioned. The housing 102 may also define one or more exterior surfaces of the device, such as all or a portion of one or more side surfaces, a rear surface, a front surface, and the like. The housing 102 may be formed of any suitable material, such as metal (e.g., aluminum, steel, titanium, or the like), ceramic, polymer, glass, or the like. The band 104 may attach the device 100 to a user, such as to the user's arm or wrist. The device 100 may include battery charging components within the device 100, which may receive power, charge a battery of the device 100, and/or provide direct power to operate the device 100 regardless of the battery's state of charge (e.g., bypassing the battery of the device 100). The device 100 may include a magnet, such as a permanent magnet, that magnetically couples to a magnet (e.g., a permanent magnet, electromagnet) or magnetic material (e.g., a ferromagnetic material such as iron, steel, or the like) in a charging dock (e.g., to facilitate wireless charging of the device 100).

The device 100 may also include a transparent cover 108 coupled to the housing 102. The cover 108 may define a front face of the device 100. For example, in some cases, the cover 108 (e.g., a front cover) defines substantially the entire front face and/or front surface of the device. The cover 108 may also define an input surface of the device 100. For example, as described herein, the device 100 may include touch and/or force sensors that detect inputs applied to the cover 108. The cover may be formed from or include glass, sapphire, a polymer, a dielectric, or any other suitable material.

The cover 108 may overlie at least part of a display 109 that is positioned at least partially within the internal volume of the housing 102. The display 109 may define an output region in which graphical outputs are displayed. Graphical outputs may include graphical user interfaces, user interface elements (e.g., buttons, sliders, etc.), text, lists, photographs, videos, or the like. The display 109 may include a liquid crystal display (LCD), an organic light emitting diode display (OLED), or any other suitable components or display technologies.

The display 109 may include or be associated with touch sensors and/or force sensors that extend along the output region of the display and which may use any suitable sensing elements and/or sensing systems and/or techniques. Using touch sensors, the device 100 may detect touch inputs applied to the cover 108, including detecting locations of touch inputs, motions of touch inputs (e.g., the speed, direction, distance, or other parameters of a gesture applied to the cover 108), or the like. Using force sensors, the device 100 may detect amounts or magnitudes of force associated with touch events applied to the cover 108. The touch and/or force sensors may detect various types of user inputs to control or modify the operation of the device, including taps, swipes, multi-finger inputs, single- or multi-finger touch gestures, presses, and the like. Touch and/or force sensors usable with wearable electronic devices, such as the device 100, are described herein with respect to FIG. 13.

The device 100 also includes an input system 112 having a knob, external portion, or other component(s) or feature(s) positioned along a side wall 101 of the housing 102. The input system 112 may also be referred to as a crown 112. At least a portion of the crown 112 (e.g., a knob 208, FIG. 2A) may protrude from and/or be generally external to the housing 102 and may define an outer peripheral surface and an axial end surface. The outer peripheral surface may have a generally circular shape or a circular exterior surface. The exterior surface of the crown 112 (or a portion thereof) may be textured, knurled, grooved, or may otherwise have features that may improve the tactile feel of the crown 112. At least a portion of the exterior surface of the crown 112 (e.g., the axial end surface) may also be conductively coupled to biometric sensing circuitry (or circuitry of another sensor that uses a conductive path to an exterior surface), as described herein.

The crown 112 may facilitate a variety of potential user interactions. For example, the knob of the crown 112 may be rotated by a user (e.g., the knob may receive rotational inputs). The arrow 115 in FIG. 1A illustrates example direction(s) of rotational inputs to the crown 112. Rotational inputs may be produced by or result from a tangential force applied to the outer peripheral surface of the crown 112, and may produce rotations about a rotation axis of the crown 112. Rotational inputs to the crown 112 may zoom, scroll, rotate, or otherwise manipulate a user interface or other object displayed on the display 109 (among other possible functions).

The knob of the crown 112 may also be translated or pressed (e.g., axially) by the user, as indicated by arrow 117. Such inputs may be applied to an axial end surface of the crown 112, and may have a force component that extends along the central or rotation axis of the crown 112. Translational or axial inputs may select highlighted objects or icons, cause a user interface to return to a previous menu or display, or activate or deactivate functions (among other possible functions).

The crown 112 may also be pivoted or "toggled" by the user applying a radial force to the knob of the crown 112, as indicated by arrows 119 and 121. Such inputs may be applied to an outer peripheral surface of the knob and may have a force component acting along a radius of the knob. Pivotal or "toggle" inputs may select highlighted objects or icons, cause a user interface to return to a previous menu or display, or activate or deactivate functions (among other possible functions).

As described herein, rotational inputs, translational inputs, and pivotal inputs may be sensed using an optical sensing system that uses light reflected by a component of the crown 112 to determine characteristics of the inputs. For example, light may be directed onto a component of the crown 112 that moves in response to the inputs, and at least a portion of that light may be reflected by the component and detected by the sensing system. The sensing system may use the reflected light to determine characteristics of the inputs. In some cases, the sensing system may use self-mixing laser interferometry to determine characteristics of the inputs. In such cases, interference (or other interaction) between a laser beam that is directed onto a surface of the moving component and the laser light that is reflected from the surface back into the laser source may be used to determine the characteristics. Notably, the crown 112 may be configured to accept (and thus detect) various combinations of inputs, and does not necessarily accept rotational, translational, and pivotal inputs. For example, a crown 112 may be configured to accept and detect rotational and translational inputs, or rotational and pivotal inputs, or translational and pivotal inputs. The device 100 may be configured to detect characteristics of any of the inputs that the crown 112 is configured to receive.

Moreover, in some cases, different sensing systems are provided to detect different types of inputs. For example, a device may include a crown that accepts rotational, translational, and pivotal inputs, and may use a laser-based sensing system to detect the rotational and pivotal inputs, and a dome switch to detect translational inputs. As another example, the device may use a laser-based sensing system to detect the rotational and translational inputs, and a dome switch or strain gauge to detect the pivotal inputs.

The crown 112 may also include or define an input feature 116 that facilitates input to biometric sensing circuitry or other sensing circuitry within the device 100. The input feature 116 may be a conductive surface that is conductively coupled, via one or more components of the device 100, to the biometric sensing circuitry. The input feature 116 may be a conductive member (e.g., a cap or disk) that is part of the crown 112. In some cases, the input feature 116 and/or the component(s) that define the input feature 116 are electrically isolated from other components of the device 100. For example, the input feature 116 may be electrically isolated from the housing 102. In this way, the conductive path from the input feature 116 to the biometric sensing circuitry may be isolated from other components that may otherwise reduce the effectiveness of the biometric sensor. In order to provide an input to the biometric sensor, a user may place a finger or other body part on the input feature 116. The biometric sensor may be configured to take a reading or measurement in response to detecting that the user has placed a finger or other body part on the input feature 116. In some cases, the biometric sensor may only take a reading or measurement when a sensing function is separately initiated by a user (e.g., by activating the function via a graphical user interface). In other cases, a reading or measurement is taken any time the user contacts the input feature 116 (e.g., to provide a rotational or translational input to the crown 112). The user may have full control over when the biometric sensor takes measurements or readings and may even have the option to turn off the biometric sensing functionality entirely.

The device 100 may also include one or more haptic actuators that are configured to produce a tactile output through the crown 112 or otherwise detectable when using the crown 112. For example, the haptic actuator may be coupled to the crown 112 and may be configured to impart a force to the crown 112. The force may cause the crown 112 to move (e.g., to oscillate or vibrate translationally and/or rotationally, or to otherwise move to produce a tactile output), which may be detectable by a user when the user is contacting the crown 112. The haptic actuator may produce tactile output by moving the crown 112 in any suitable way. For example, the crown 112 (or a component thereof) may be rotated (e.g., rotated in a single direction, rotationally oscillated, or the like), translated (e.g., moved along a single axis), or pivoted (e.g., rocked about a pivot point) by the haptic actuator. In other cases, the haptic actuator may produce tactile outputs using other techniques, such as by imparting a force to the housing 102 (e.g., to produce an oscillation, vibration, impulse, or other motion), which may be perceptible to a user through the crown 112 and/or through other surfaces of the device 100, such as the cover 108, the housing 102, or the like. Any suitable type of haptic actuator and/or technique for producing tactile output may be used to produce these or other types of tactile outputs, including electrostatics, piezoelectric actuators, oscillating or rotating masses, ultrasonic actuators, reluctance force actuators, voice coil motors, Lorentz force actuators, or the like. In some cases, haptic outputs from a haptic actuator may be used to provide tactile outputs when a crown that does not otherwise include a tactile element (e.g., a tactile switch) is actuated. For example, when a translational or axial force is applied to a crown that uses laser-based sensing systems to detect a translational input (and thus does not include a tactile switch or other mechanical tactile component for translational input sensing), a haptic actuator may produce a haptic output when the translational input is detected.

Tactile outputs may be used for various purposes. For example, tactile outputs may be produced when a user translates or pivots the crown 112 with an input force, in order to indicate that the device 100 has registered the manipulation as an input to the device 100. As another example, tactile outputs may be used to provide feedback when the device 100 detects a rotation of the crown 112 or a gesture being applied to the crown 112. For example, a tactile output may produce a repetitive "click" sensation as the user rotates the crown 112 or applies a gesture to the crown 112. Tactile outputs may be used for other purposes as well.

The device 100 may also include other inputs, switches, buttons, or the like. For example, the device 100 includes a button 110. The button 110 may be a movable button (as depicted) or a touch-sensitive region of the housing 102. The button 110 may control various aspects of the device 100. For example, the button 110 may be used to select icons, items, or other objects displayed on the display 109, to activate or deactivate functions (e.g., to silence an alarm or alert), or the like.

Figure 1B:
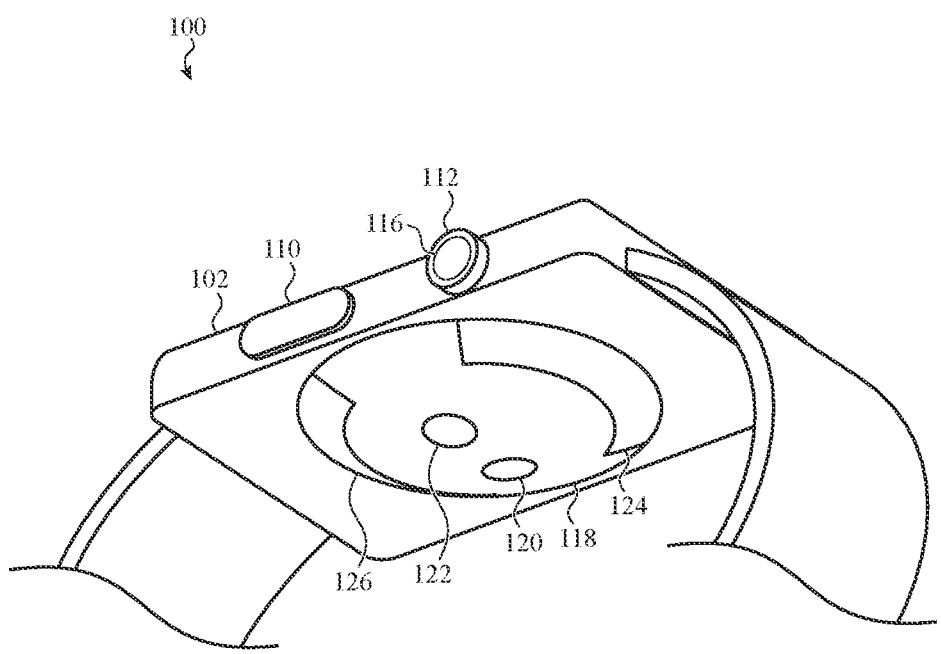

FIG. 1B shows a rear side of the device 100. The device 100 includes a rear cover 118 coupled to the housing 102 and defining at least a portion of the rear exterior surface of the device 100. The rear cover 118 may be formed of or include any suitable material(s), such as sapphire, polymer, ceramic, glass, or any other suitable material.

The rear cover 118 may define a plurality of windows to allow light to pass through the rear cover 118 to and from sensor components within the device 100. For example, the rear cover 118 may define an emitter window 120 and a receiver window 122. While only one each of the emitter and receiver windows are shown, more emitter and/or receiver windows may be included (with corresponding additional emitters and/or receivers within the device 100). The emitter and/or receiver windows 120, 122 may be defined by the material of the rear cover 118 (e.g., they may be light-transmissive portions of the material of the rear cover 118), or they may be separate components that are positioned in holes formed in the rear cover 118. The emitter and receiver windows, and associated internal sensor components, may be used to determine biometric information of a user, such as heart rate, blood oxygen concentrations, and the like, as well as information such as a distance from the device to an object. The particular arrangement of windows in the rear cover 118 shown in FIG. 1B is one example arrangement, and other window arrangements (including different numbers, sizes, shapes, and/or positions of the windows) are also contemplated. As described herein, the window arrangement may be defined by or otherwise correspond to the arrangement of components in the integrated sensor package.

The rear cover 118 may also include one or more electrodes 124, 126. The electrodes 124, 126 may facilitate input to biometric sensing circuitry or other sensing circuitry within the device 100 (optionally in conjunction with the input feature 116). The electrodes 124, 126 may be a conductive surface that is conductively coupled, via one or more components of the device 100, to the biometric sensing circuitry.

Figure 2A:
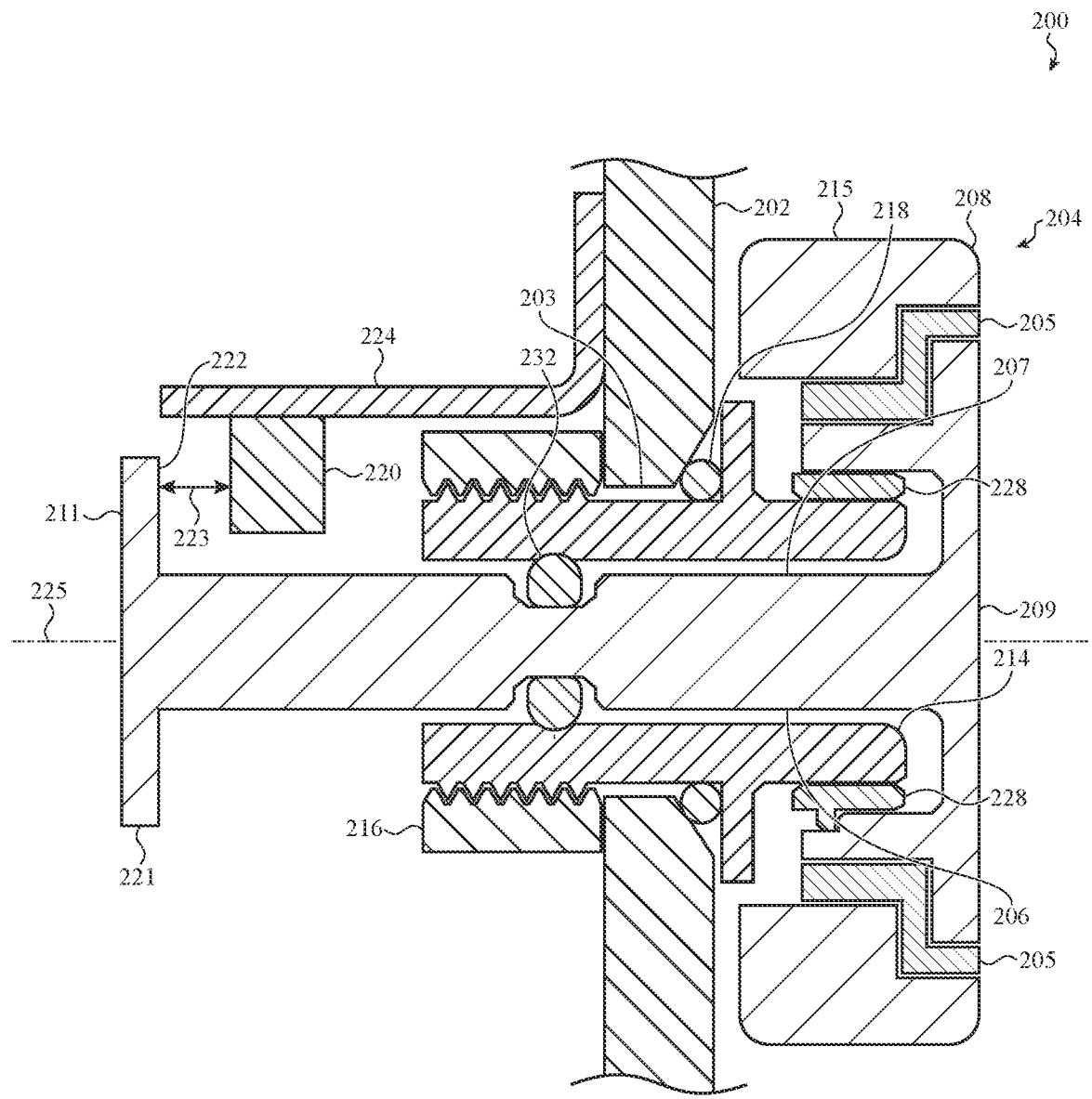
FIGS. 2A-2D depict partial cross-sectional views of a device with example crown input systems.

FIG. 2A depicts a partial cross-sectional view of a portion of an electronic device 200 having a crown input system 204 (also referred to herein simply as a crown 204), viewed along line 2A-2A in FIG. 1A. The device 200 may correspond to or be an embodiment of the device 100, and the crown 204 may generally correspond to the crown 112 in FIGS. 1A-1B.

As shown in FIG. 2A, a device 200 may include a housing with a side wall 202 (which may generally correspond to or be an embodiment of the side wall 101) having an opening 203 (e.g., a through-hole). A crown 204 (which may generally correspond to or be an embodiment of the crown 112) may include a knob 208 that is external to the housing and configured to receive a rotational input, a translational input, and a pivotal input (and/or subsets thereof), and a shaft assembly 206 that is coupled to the knob 208 and extends through the opening 203 such that it is at least partially within the housing. The knob 208 and shaft assembly 206 may be a single unitary component, or they may include multiple components or pieces coupled together. In either case, a rotational input applied to the knob 208 causes the shaft assembly 206 (or at least a portion thereof) to rotate, a translational input applied to the knob 208 causes the shaft assembly 206 (or at least a portion thereof) to translate, and a pivotal input applied to the knob 208 causes the shaft assembly 206 (or at least a portion thereof) to pivot about a shaft pivot. The knob 208 may be a single unitary component (e.g., a single piece of metal), or it may include multiple components or pieces coupled together. The shaft assembly 206 may be a single unitary component (e.g., a single piece of metal), or it may include multiple components or pieces coupled together. In some cases, the shaft assembly 206 includes a shaft member 207. The shaft member 207 may be unitary with the knob 208, or it may be a separate component that is attached to the knob 208, such as via threads, mechanical interlocks, adhesives, etc.

The shaft assembly 206 may include a rotor 211. The rotor 211 may be rigidly coupled to the knob 208 and may move in response to any movement of the knob 208. For example, the rotor 211 may rotate in response to a rotational input, translate in response to a translational input, and pivot in response to a pivotal input (or otherwise move along an arc-shaped path resulting from a pivotal input). The rotor 211 may be unitary with the shaft member 207, or it may be a separate component that is attached to the shaft member 207. The rotor 211 may define an outer peripheral surface 221 and a face surface 222. The outer peripheral surface 221 may be a cylindrical surface or a conical surface as described herein.

As shown, the knob 208 may be defined by a cap portion 209 of the shaft assembly 206, a ring member 215, and a joint structure 205. The cap portion 209 and the ring member 215 may be formed from or include conductive materials, and the joint structure 205 may be formed from or include nonconductive materials, such as a polymer. In some cases, the joint structure 205 electrically isolates the cap portion 209 from the ring member 215 (and optionally structurally couples the cap portion 209 and the ring member 215). In some cases, the cap portion 209 defines a conductive surface for a biometric or physiological sensor (e.g., the input feature 116, FIG. 1B). The joint structure 205 may isolate the cap portion 209 (and thus the conductive input surface) from the ring member 215 to prevent or inhibit conductive couplings via the ring member 215 that may interfere with the operation of the sensor.

A collar 214 may abut the housing (e.g., the side wall 202), extend through the opening 203, and interlock with a bracket 216. The bracket 216 may overlap the interior side of the side wall 202 and retain the collar 214 in place. A sealing member 218 may be positioned between the housing and the collar 214 and may compress when the collar 214 is interlocked with the bracket 216.

The crown 204 may include support members that support the crown 204 in a neutral or rest position while allowing the crown 204 to move in response to various inputs. For example, the crown 204 may include a first support 228 between the knob 208 of the crown 204 and a stationary structure (e.g., the collar 214). The crown 204 may also include a second support 232 between the shaft assembly 206 and a surface of a hole through which the shaft assembly 206 extends. The first and second supports 228, 232 may allow the crown to be moved in response to various combinations of rotational inputs, translational inputs, and pivotal inputs. For example, the first and second supports 228, 232 may define sliding interfaces along which the crown 204 may slide when the crown 204 is rotated or translated. At least the first support 228 may also be configured to deform in response to a pivotal input, and the second support 232 may define a pivot point for the shaft assembly 206 to define the pivotal motion of the crown in response to a radial force, as described herein. The first and second supports 228, 232, may also perform sealing functions, preventing or inhibiting the ingress of contaminants into the device 200. The first and second supports 228, 232 may be formed from any suitable material or materials, such as silicone, rubber, or other polymers.

The physical properties of the first and second supports 228, 232 may be selected in order to facilitate certain crown movements and other physical and tactile targets. For example, the first support 228 may be configured to deform when subjected to a radial force (e.g., for a pivotal input, shown and described with respect to FIG. 2B), while the second support 232 may be configured to substantially retain its shape (e.g., not deform or deform to a lesser degree) when the crown 204 is subjected to a radial force. Thus, the crown 204 may pivot about the second support 232 to result in the rotor 211 moving in a desired manner. Thus, the physical properties (e.g., hardness, stiffness, durometer, shape, etc.) of the first and second supports 228, 232 may be selected to result in the desired structural support and to facilitate the desired motion for the crown 204. In some cases, the hardness of the second support 232 is greater than the hardness of the first support 228.

The device 200 may include a sensing system configured to detect various inputs that may be provided to the crown 204 (e.g., combinations of rotational, translational, and pivotal inputs). The sensing system may include a laser sensing unit 220 configured to emit one or more laser beams 223 onto the rotor 211 of the shaft assembly 206. The laser sensing unit 220 may be positioned on a support structure 224, which may be coupled to the housing or another structure and may support the laser sensing unit 220 relative to other crown components. As shown in FIG. 2A, the laser beams may be incident on the face surface 222 of the rotor 211, though in other examples one or more laser beams may be incident on the outer peripheral surface 221. The laser beams may be exclusively incident on the face surface 222, on the outer peripheral surface 221, or different laser beams may be incident on different surfaces.

The laser sensing unit 220 may include one or more laser modules that are configured to direct or otherwise emit laser beams onto the rotor 211 (or another surface of the crown system). The laser sensing unit 220 may include one laser module for each laser beam that is emitted onto the rotor 211. The laser modules may be or may include VCSEL elements that produce laser beams. The VCSEL elements, optionally in conjunction with other circuitry, detect parameters of the motion of the rotor 211 using self-mixing laser interferometry techniques.

As described above, the laser sensing unit 220, optionally in conjunction with processors and other circuitry, may use laser-based self-mixing interferometry to determine characteristics of rotational, translational, and pivotal movements of a crown. For example, a laser-based system may use laser emitters, such as vertical-cavity surface-emitting lasers (VCSELs), to direct one or multiple laser beams (e.g., beams of coherent light) onto a surface of a component of the crown that moves in conjunction with the various inputs that the crown is configured to receive (e.g., the rotor 211). The laser beams may be aimed at the surface in such a way that some of the light from the laser beam is reflected by the surface and directed back into the laser emitter. The effect of the reflected light on the laser emitter may be used to determine parameters such as the speed, direction, and distance of the motion of the surface. More particularly, the laser beams may be aimed at the surface such that the beam axes of the laser beams are incident on the surface at an oblique angle (e.g., the beam axes of the laser beams are not perpendicular to or parallel to the surface at the area of incidence of the laser beams). In this configuration, the motion of the moving surface affects the frequency of the reflected light. For example, if the surface of the rotor 211 is rotating in one direction, the frequency of the reflected light may be higher than that of the incident light, and if the rotor 211 is rotating in the opposite direction, the frequency of the reflected light may be lower than that of the incident light. Moreover, a greater speed of motion may produce a greater shift in frequency of the reflected light. Thus, a higher speed of motion may result in a larger frequency shift of the reflected light, as compared to a lower speed.

The difference in the frequency of the emitted light and the reflected light may have an effect on the laser emitter that can be used to detect the speed and direction of a motion of the crown. For example, when the reflected light is received by the laser emitter (while the laser emitter is also emitting light), the reflected light may cause a change in a frequency, amplitude, and/or other property(s) of the light being produced by the laser. These changes may be detected by the laser sensing unit 220 (and/or associated components and circuitry) and used to generate a signal that corresponds to a motion of the crown. The signal may then be used to control functions of the device, such as to modify graphical outputs being displayed on the device. Laser sensing units described herein, such as the laser sensing unit 220, may be part of a laser sensing system for a device. A laser sensing system includes a laser sensing unit and optionally includes or uses additional processors, circuitry, memory, or the like, to facilitate detection of inputs using information from the laser sensing unit (e.g., from the laser modules of a laser sensing unit).

Figure 8:
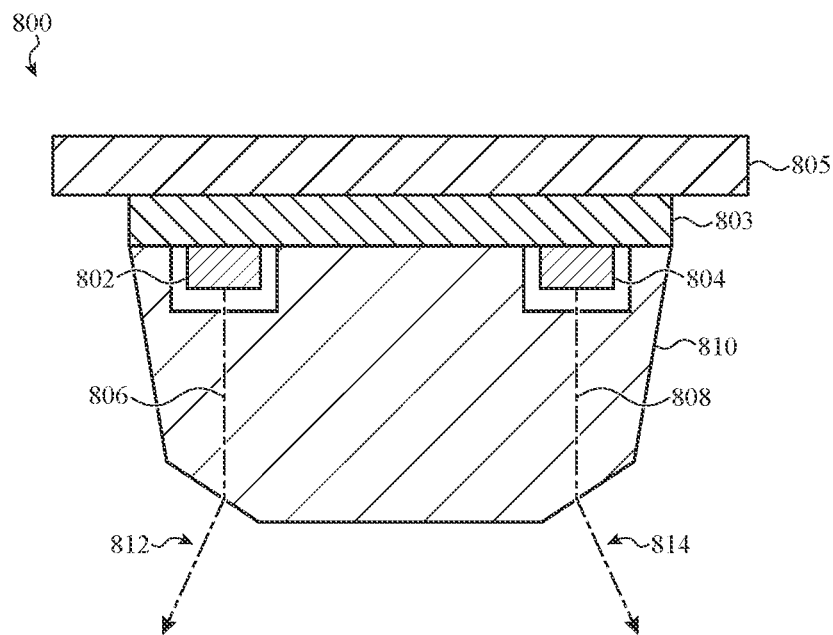
FIG. 8 depicts a partial cross-sectional view of an example laser sensing unit.
Figure 9:
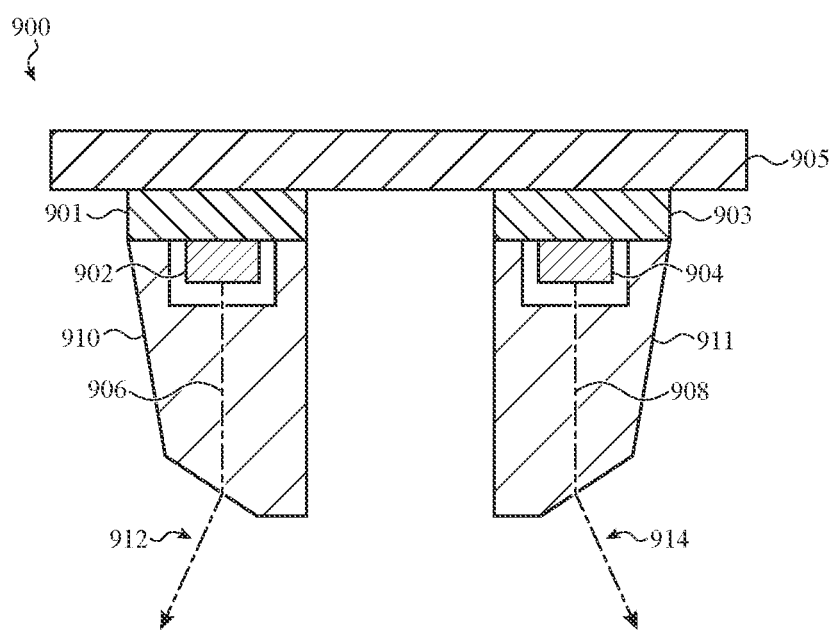
FIG. 9 depicts a partial cross-sectional view of another example laser sensing unit.

As described herein, the laser sensing unit 220 may include one or more beam directing structures (e.g., a lens, refractor, prism, or other optical component or assembly) that aims the laser beam(s) along beam paths towards the surface of the rotor 211. In some cases, the beam-directing structure changes a direction of a laser beam. For example, as shown in FIGS. 8 and 9, a beam-directing structure may define a refracting surface that changes the direction of a laser beam so that the laser beam is incident on the rotor 211 at a desired angle of incidence. In other cases, the sensing system may not include a beam-directing structure, or it may include a different beam-directing structure or beam-directing structures.

While FIG. 2A illustrates a single laser beam 223, this is merely for illustration. The laser sensing unit 220 may emit multiple laser beams along multiple beam paths, as described herein, optionally including beams that are incident on different surfaces or components of the crown 204.

Figure 2B:
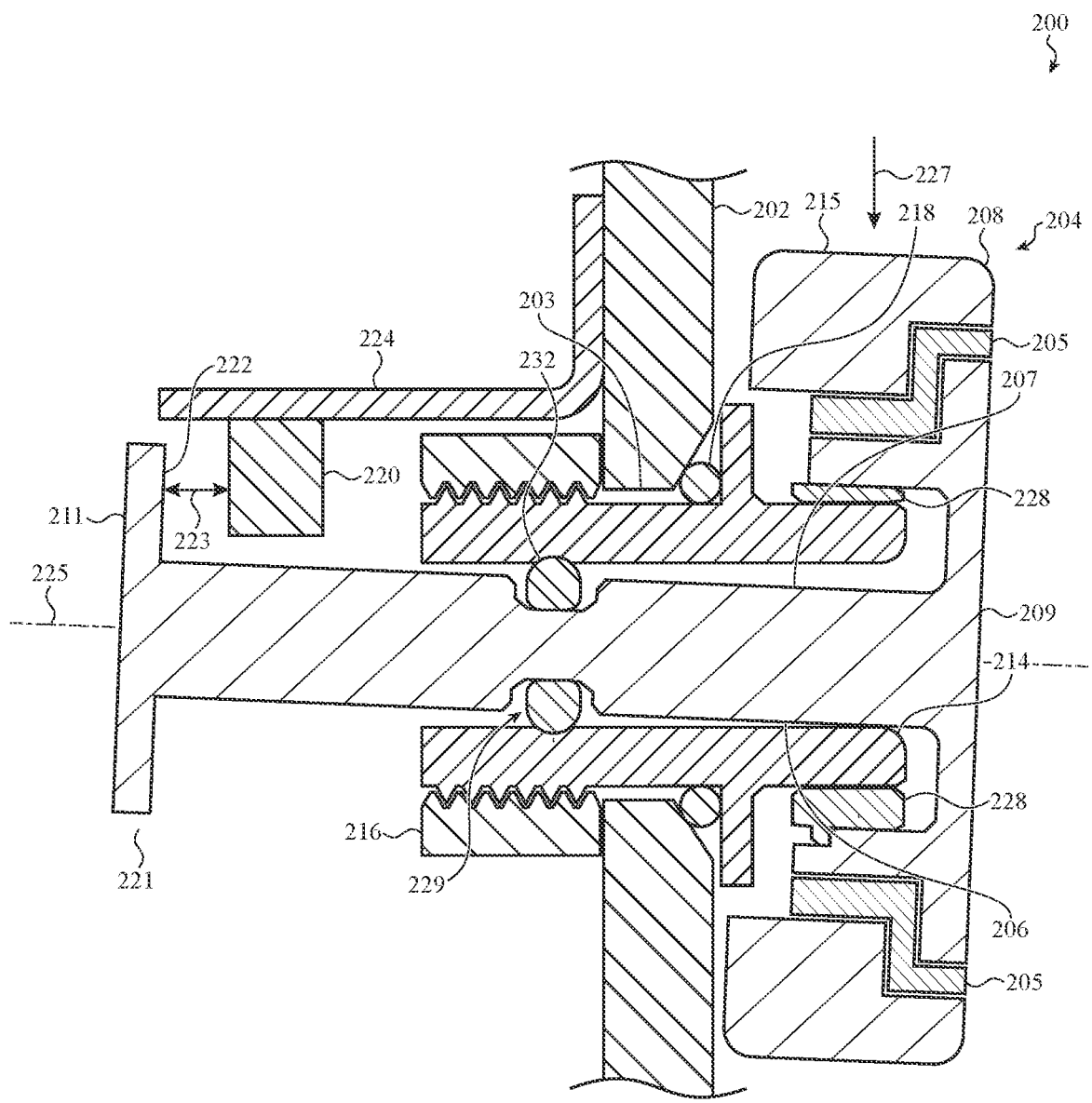
Figure 2C:
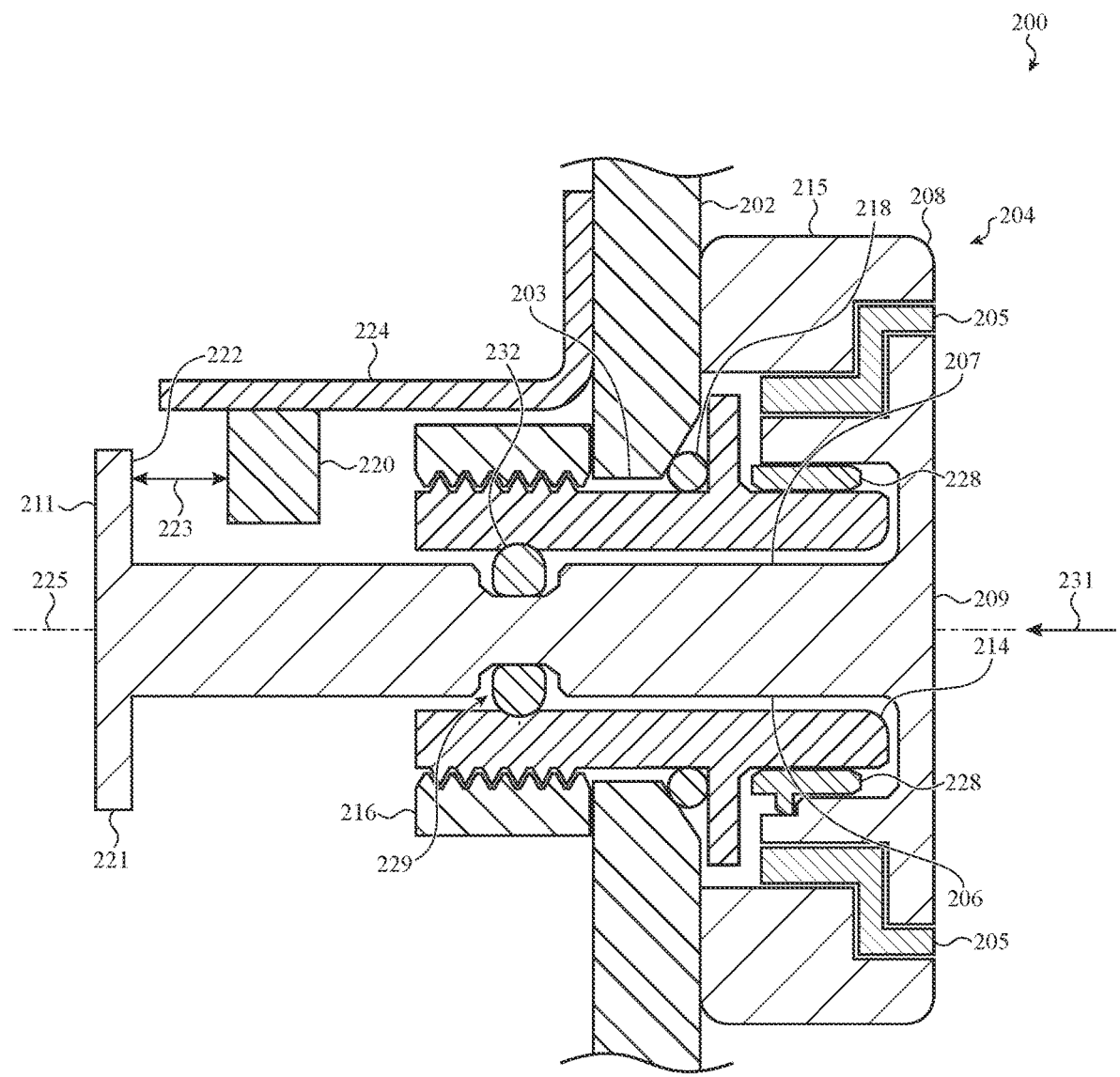

FIGS. 2A-2C illustrate the crown receiving various inputs, illustrating how the inputs may cause motion of the rotor 211 and how those movements may be detected by a laser sensing system that includes the laser sensing unit 220. FIG. 2A may represent the crown 204 receiving a rotational input. The rotational input may cause the crown to rotate about a shaft axis 225, which in turn causes the rotor 211 to rotate about the shaft axis 225. The laser sensing system may detect one or more parameters of the rotational input based at least in part on information from the laser modules of the laser sensing unit 220. For example, as described herein, the laser modules may detect how the rotation of the rotor 211 affects the frequency of the light beams emitted by the one or more laser modules, and using that information, determine parameters of the rotational input (e.g., speed, direction, distance of rotation). As described herein, the laser sensing unit 220 may be configured to direct one or more laser beams onto the rotor 211 at certain angles, where the angles result in a detectable interference result when the rotor 211 is rotated.

FIG. 2B illustrates the crown 204 receiving a pivotal or "toggle" type input. The pivotal input may cause the crown to pivot about a shaft pivot 229, which in turn causes the rotor 211 to move along a path defined by the shaft assembly 206, rotor shape and location, and the location of the shaft pivot 229 rotate about the shaft axis 225. For example, the rotor 211 may generally travel along an arc-shaped path when the crown 204 is pivoted. The shaft pivot 229 may be defined by the second support 232, which is positioned in a hole through which the shaft assembly 206 extends. When a radial input (arrow 227) is applied to the crown knob 208, the shaft assembly 206 pivots about the support, resulting in a corresponding movement of the rotor 211. Because the movement of the rotor 211 in response to a pivotal input is different than the movement of the rotor in response to a rotational (or translational) input, the effect of the rotor 211 on the laser beams may be different than that produced by a rotational or translational movement, and the laser sensing system may determine, based on the effect, parameters of the pivotal movement (e.g., a speed, distance, direction of the movement).

The second support 232 generally supports the shaft assembly 206 while allowing the shaft assembly 206 to translate, rotate, and pivot. The second support 232 may also provide a scaling function, preventing or inhibiting ingress of contaminants into the device. As shown, the second support 232 may be or may include an O-ring positioned between a surface of the shaft assembly 206 and a surface of a hole (e.g., in the collar 214). In some cases, additional supports and/or seals are provided between the rotating and non-rotating portions of the crown 204.

The first and second supports 228, 232 may be configured to return the crown 204 to a neutral or centered position after receiving a pivotal input. For example, the materials and shapes of the first and second supports 228, 232 may be selected such that the shaft axis 225 returns to a target position (e.g., an angle and/or position of the shaft axis 225 is within a threshold margin to a target axis) after a radial force is removed from the knob 208. In some cases, the threshold margin is within about 5 degrees of the target axis, within about 2 degrees of the target axis, within about 1 degree of the target axis, or another suitable margin. In some cases, other pivot and centering mechanisms are provided instead of or in addition to the first and second supports, such as a pin extending through the shaft assembly and about which the shaft assembly pivots.

The laser sensing system may detect one or more parameters of the pivotal input based at least in part on information from the laser modules of the laser sensing unit 220. For example, as described herein, the laser modules may detect how the arc-shaped path of the rotor 211 affects the frequency of the light beams emitted by the one or more laser modules, and using that information, determine parameters of the pivotal input (e.g., speed, direction, distance of rotation). As described herein, the laser sensing unit 220 may be configured to direct one or more laser beams onto the rotor 211 at certain angles, where the angles result in a detectable interference result when the rotor 211 is moved by a pivotal input.

FIG. 2C illustrates the crown 204 receiving a translational input. The translational input may cause the crown to translate along the shaft axis 225, which in turn causes the rotor 211 to translate relative to the laser sensing unit 220. For example, when an axial input (arrow 231) is applied to the crown knob 208, the shaft assembly 206 translates along the shaft axis 225, resulting in a corresponding movement of the rotor 211. Because the movement of the rotor 211 in response to a translational input is different than the movement of the rotor in response to a rotational (or pivotal) input, the effect of the rotor 211 on the laser beams may be different than that produced by a rotational or pivotal movement, and the laser sensing system may determine, based on the effect, parameters of the translational movement (e.g., a speed, distance, direction of the movement).

Figure 2D:
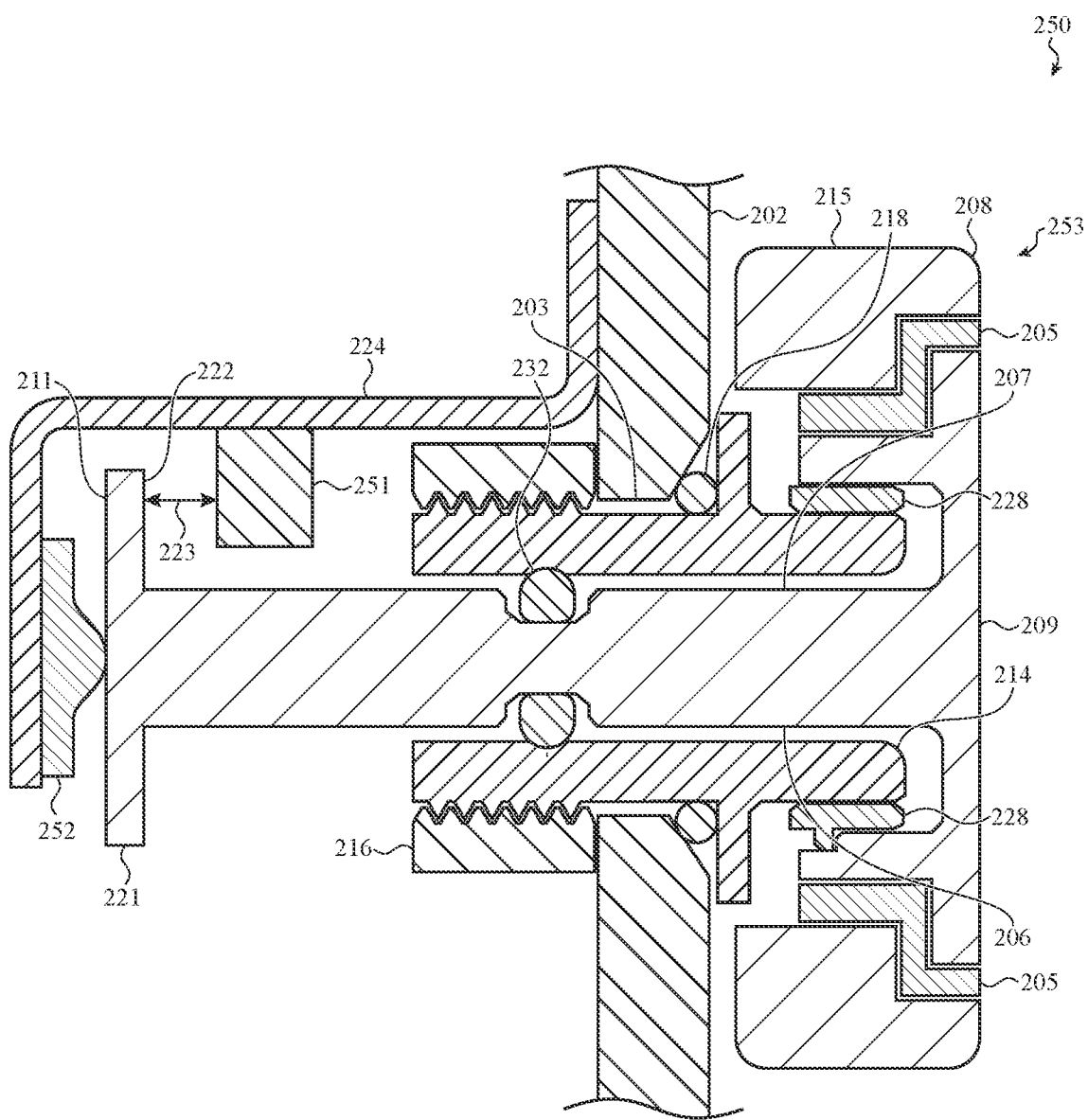

FIG. 2D illustrates another example device 250, in which a laser-based sensing system 251 is used to detect rotational and pivotal inputs to the crown 253 (as described with respect to FIGS. 2A-2B), and a collapsible dome switch 252 is used to detect translational inputs to the crown 253. The laser collapsible dome switch 252 may be positioned on a support structure 224, which may be coupled to the housing or another structure and may support the collapsible dome switch 252 relative to other crown components. The other components of the device 250 generally correspond to those in FIGS. 2A-2C.

Figure 3:
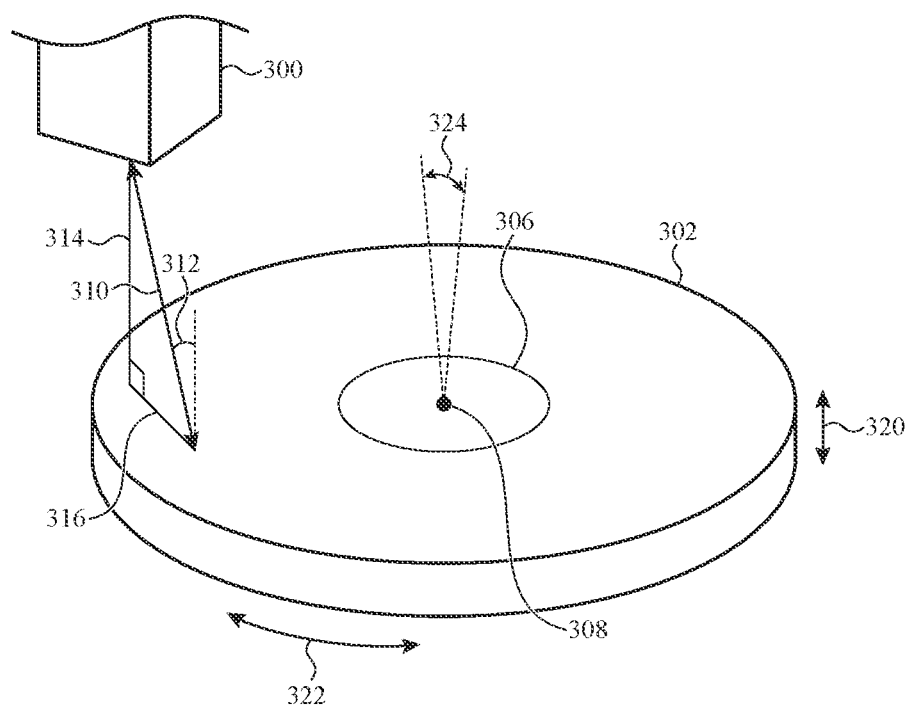
FIG. 3 depicts a perspective view of a portion of an example crown input system with a laser sensing system.

FIG. 3 illustrates a perspective view of a portion of a crown input system, including a laser sensing unit 300 (which may correspond to or be an embodiment of the laser sensing unit 220) and a rotor 302 (which may correspond to or be an embodiment of the rotor 211). Point 308 may generally correspond to the shaft axis (e.g., the axis through the shaft assembly, about which the shaft assembly and rotor rotates and along which the shaft assembly and the rotor translate), and the circle 306 generally corresponds to the location where the shaft joins or extends from the rotor 302.

In this example, the laser sensing unit 300 is emitting a single laser beam 310 onto a surface of the rotor 302. The laser beam 310 may have an angle of incidence 312 on the face surface of the rotor 302. The angle of incidence 312 may result in the beam 310 being oblique to the face surface of the rotor 302, thus enabling a rotation of the rotor to produce an interference effect on the laser beam 310 that can be detected by a laser sensing system that includes the laser sensing unit 300.

As noted above, the particular orientation of the laser beam 310 may be selected so that various crown motions can be detected by the laser sensing system. For example, as shown in FIG. 3, the vector of the laser beam 310 may contain a first component 314 and a second component 316 that is perpendicular to the first component 314. The first component 314 may be generally parallel to the shaft axis 308, and thus movements of the rotor 302 that are parallel to the shaft axis 308 (e.g., translational inputs, indicated by arrow 320) may result in a measurable effect on the laser beam 310 (e.g., may result in a detectable interference). The second component 316 may be generally parallel to the plane in which the rotor 302 rotates, and thus rotational movements of the rotor (e.g., rotational inputs, indicated by arrow 322) may result in a measurable effect on the laser beam 310. The laser sensing system may detect rotational and translational inputs based on the effect of the resulting rotor movements on the laser beam 310. In some cases, the laser sensing system may also detect pivotal inputs (e.g., represented by arrow 324), to the extent that the pivotal inputs produce a movement of the rotor 302 that has a detectable effect on the laser beam 310 (e.g., having components in the first or second vector components 314, 316.

Figure 4:
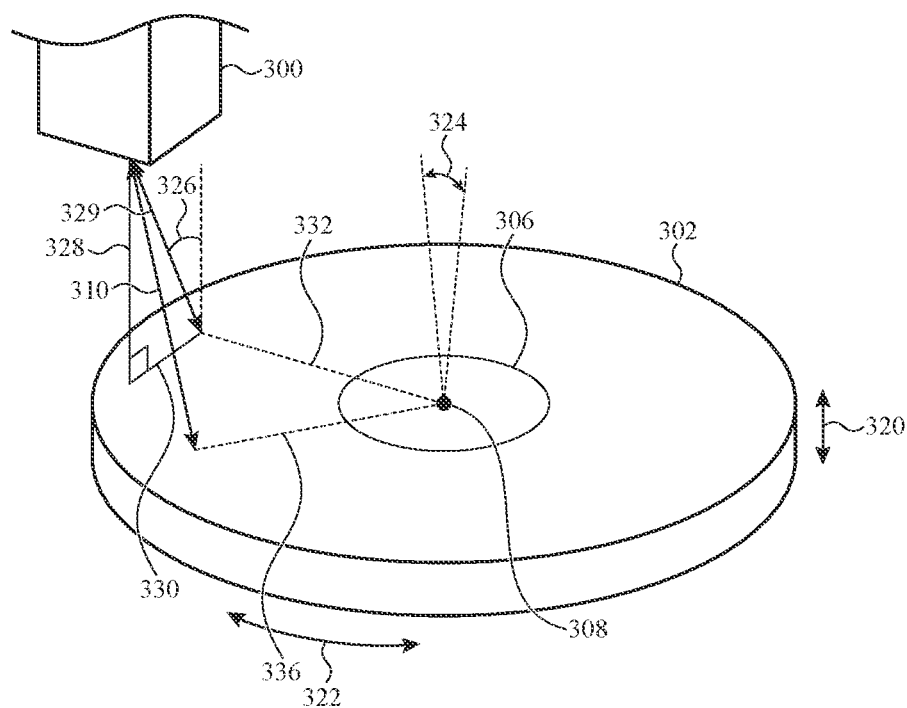
FIG. 4 depicts a perspective view of a portion of another example crown input system with a laser sensing system.

FIG. 4 illustrates an example in which the laser sensing unit 300 is configured to emit two laser beams, 310 and 329, each incident at a different location on the rotor 302. The vector of the second laser beam 329 may contain a first component 328 and a second component 330 that is perpendicular to the first component 328. The first component 328 may be generally parallel to the shaft axis 308, and the second component 330 may be generally parallel to the plane in which the rotor 302 rotates.

The second laser beam 329 may have a same angle of incidence 326 as the first laser beam 310, or it may have a different angle of incidence. In examples where the angles of incidence are different, an input that moves both locations of incidence equivalently may result in different effects on the laser beam, based on differences in the vector components of each laser beam. In some cases, these differences may be used to help improve a resolution, sensitivity, confidence, or other parameter of a motion detection by the laser sensing system.

The first laser beam 310 may be incident on the rotor 302 at a first radial distance 336 from the rotational axis 308, and the second laser beam 329 may be incident on the rotor 302 at a second radial distance 332 from the rotational axis 308. The radial distances 332, 336 may be the same, or they may be different.

In some cases, using two laser beams allows the sensing system to disambiguate between different types of inputs. For example, certain movements of the rotor 302 may cause ambiguous measurements by the laser sensing system (e.g., a detected motion may be consistent with a translation and a pivot, or a rotation and a pivot). (The particular movements that result in ambiguous measurements may depend on the particular arrangement and geometry of the rotor, laser beams, crown components, etc.) By providing multiple laser beams, some movements that are ambiguous in a single-beam implementation may be successfully differentiated. For example, in some implementations, a particular pivotal input and a rotational input may have similar effects on a single laser beam. By using a second laser beam that is incident at a different location (e.g., having a different radial distance from the rotational axis and optionally a different angle of incidence or other geometry relative to the rotor), the second beam may be affected differently than the first beam by the two different inputs. Thus, the laser sensing system can determine whether a movement is the result of a rotational input or a pivotal input.

As another example, for a rotational input in a given rotation direction, interference between the first laser beam 310 and its reflected light may indicate a movement having a first speed and a first direction, and the second interference between the second laser beam 329 and its reflected light may indicate a movement having a second speed equal to the first speed and a second direction different from the first direction. By contrast, a translational input or a pivotal input may indicate movements having the same directions.

Figure 5:
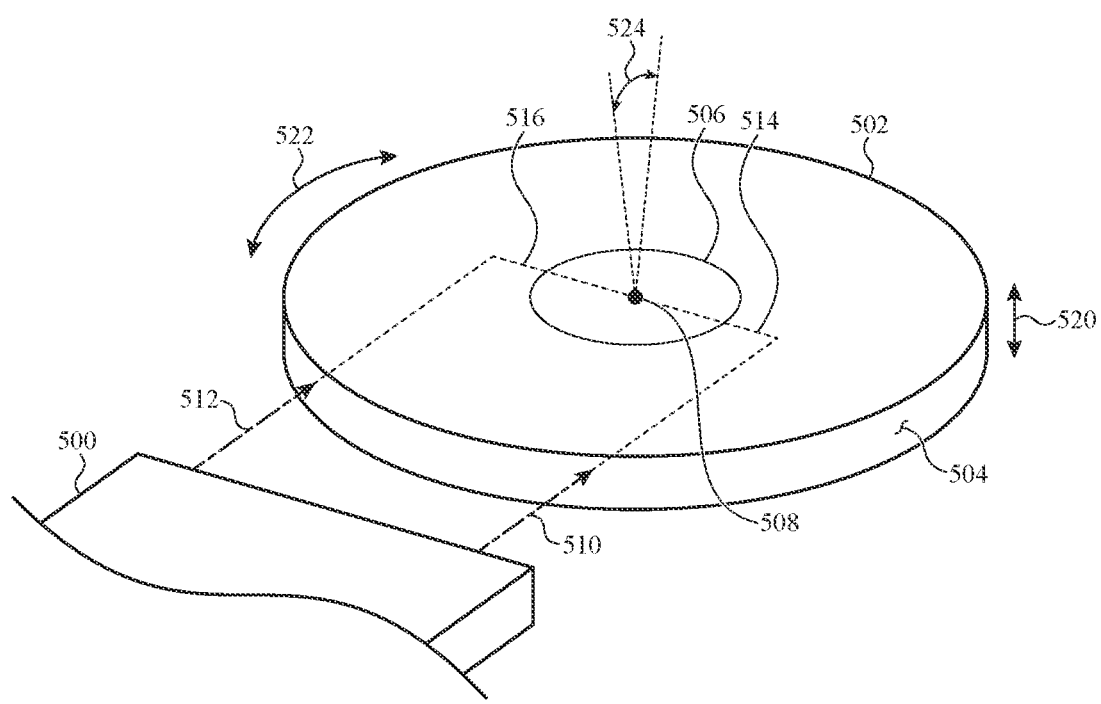
FIG. 5 depicts a perspective view of a portion of another example crown input system with a laser sensing system.

FIG. 5 illustrates a perspective view of a portion of a crown input system, including a laser sensing unit 500 (which may correspond to or be an embodiment of the laser sensing unit 220) and a rotor 502 (which may correspond to or be an embodiment of the rotor 211). Point 508 may generally correspond to the shaft axis (e.g., the axis through the shaft assembly, about which the shaft assembly and rotor rotates and along which the shaft assembly and the rotor translate), and the circle 506 generally corresponds to the location where the shaft joins or extends from the rotor 502.

In this example, the laser sensing unit 500 is emitting two laser beams, 510 and 512 onto an outer peripheral surface 504 of the rotor 502. In some cases, the laser beams 510, 512 are parallel; in other examples they are not parallel to one another. The angles of incidence of the beams 510, 512 on the outer peripheral surface 504 may correspond to the beams 510, 512 being oblique to the outer peripheral surface 504, thus enabling a rotation of the rotor to produce an interference effect on the laser beams 510, 512 that can be detected by the laser sensing unit 500. In some cases, the beams 510, 512 may be aligned distances 514, 516 from the shaft axis. The distances 514, 516 may be equal, but on opposite sides of the shaft axis. In some cases, the distances may be different.

As described with respect to FIGS. 3 and 4, the angle that the beams 510, 512 form against the outer peripheral surface 504, may be configured so that the beams have certain vector components that provide information about target movements of the rotor 502, thus facilitating sensing, by the laser sensing system, multiple different inputs. For example, as shown in FIG. 5, the laser sensing system may detect rotational inputs (e.g., arrow 522), as well as pivotal inputs (arrow 524). The pivotal inputs may result in the outer peripheral surface moving towards and/or away from the laser sensing unit 500 (in addition to rocking or traveling along an arc-shaped path, as defined by the pivoting geometry of the crown). This may correspond to the rotor 502 rocking generally along a plane that is parallel to the beams 510, 512. In some cases, depending on the direction of the radial force that is producing the pivotal input, the pivotal input may result in a different motion (e.g., the rotor 502 rocking generally along a plane that is perpendicular to the beams 510, 512).

In some cases, the laser sensing system may also detect translational inputs (e.g., arrow 520) based on the effect that the translational movement has on the beams 510, 512. In some cases, to detect translational movements, the beams 510, 512 may be angled relative to the outer peripheral surface such that the beams include a vector component, relative to the surface, that allows for detection of the translation.

Figure 6A:
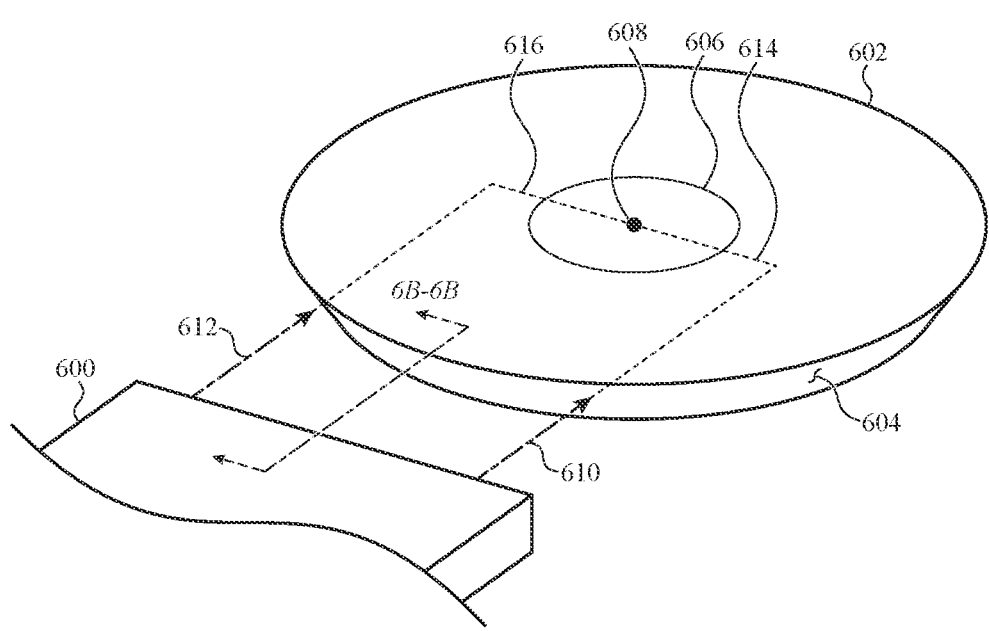
FIG. 6A depicts a perspective view of a portion of another example crown input system with a laser sensing system.

FIG. 6A illustrates a perspective view of a portion of another crown input system, including a laser sensing unit 600 (which may correspond to or be an embodiment of the laser sensing unit 220) and a rotor 602 (which may correspond to or be an embodiment of the rotor 211). Point 608 may generally correspond to the shaft axis (e.g., the axis through the shaft assembly, about which the shaft assembly and rotor rotates and along which the shaft assembly and the rotor translates), and the circle 606 generally corresponds to the location where the shaft joins or extends from the rotor 602. The crown input system in FIG. 6A generally corresponds to the arrangement of the crown input system in FIG. 5, in which two laser beams are directed onto an outer peripheral surface of the rotor, but in the example in FIG. 6A, the outer peripheral surface 604 is angled (e.g., defines a conical surface), which produces a different effective angle of incidence and/or vector of the laser beams relative to the surface 604, and which may therefore facilitate the detection of different combinations of inputs.

Figure 6B:
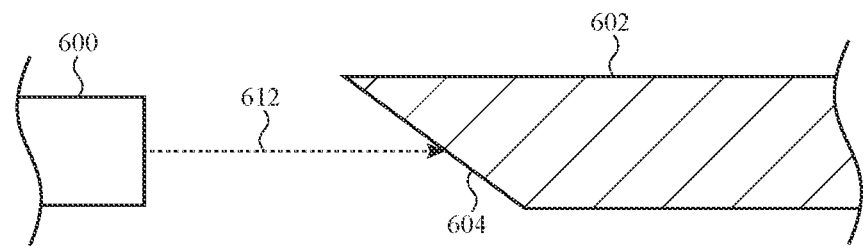
FIGS. 6B-6D depict partial cross-sectional views of the crown input system of FIG. 6A.
Figure 6C:
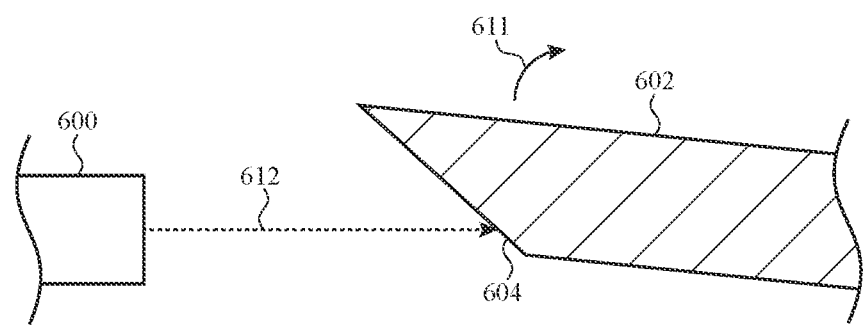
Figure 6D:
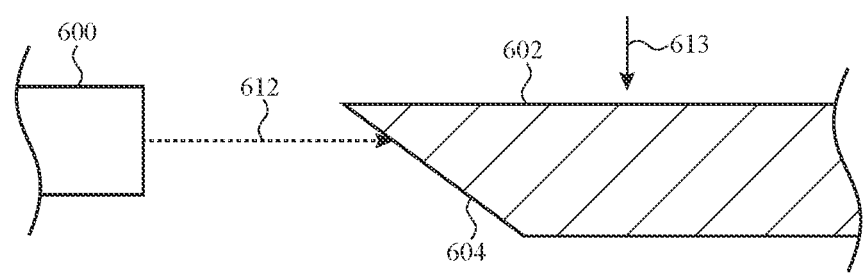

FIGS. 6B-6D depict partial cross-sectional views of the crown input system of FIG. 6A, viewed along line 6B-6B in FIG. 6A, illustrating how different input types may result in different movements of the outer peripheral surface 604 relative to the laser beams 610, 612. FIG. 6B illustrates the rotor 602 in a neutral or centered position, in which the crown is neither being pivoted nor translated. In this configuration, the rotor 602 may be rotating as a result of a rotational input. The laser sensing system may detect the rotational input as described herein, in part due to the angle of incidence between the outer peripheral surface 604 and the laser beams 610, 612 resulting from the beams 610, 612 being aligned at distances 614, 616 from the shaft axis (FIG. 6A). In particular, the rotation of the surface 604 may result in detectable effects (e.g., interference) on the laser beam 612 that can be used by the laser sensing system to determine parameters of the rotational input.

FIG. 6C illustrates the rotor 602 during a pivotal input, resulting in the rotor 602 moving about an arc defined by the pivot geometry of the crown (as indicated by arrow 611). As illustrated in FIG. 6C, the relative distance between the laser sensing unit 600 and the point of incidence on the outer peripheral surface 604 has changed as a result of the pivotal input (e.g., the length of the beam 612 has increased). Additionally, the location of incidence of the beam 612 has moved along the outer peripheral surface 604 (e.g., essentially sliding along the outer peripheral surface 604) as a result of the movement of the rotor 602. Both the change in length and the change in location of incidence may result in detectable effects (e.g., interference) on the laser beam 612 that can be used by the laser sensing system to determine parameters of the pivotal input.

FIG. 6D illustrates the rotor 602 during a translational input, resulting in the rotor 602 moving along a direction indicated by arrow 613. As illustrated in FIG. 6D, the relative distance between the laser sensing unit 600 and the point of incidence on the outer peripheral surface 604 has changed as a result of the translational input (e.g., the length of the beam 612 has decreased). Additionally, the location of incidence of the beam 612 has moved along the outer peripheral surface 604 (e.g., essentially sliding along the outer peripheral surface 604) as a result of the movement of the rotor 602. Both the change in length and the change in location of incidence may result in detectable effects (e.g., interference) on the laser beam 612 that can be used by the laser sensing system to determine parameters of the translational input.

Figure 7:
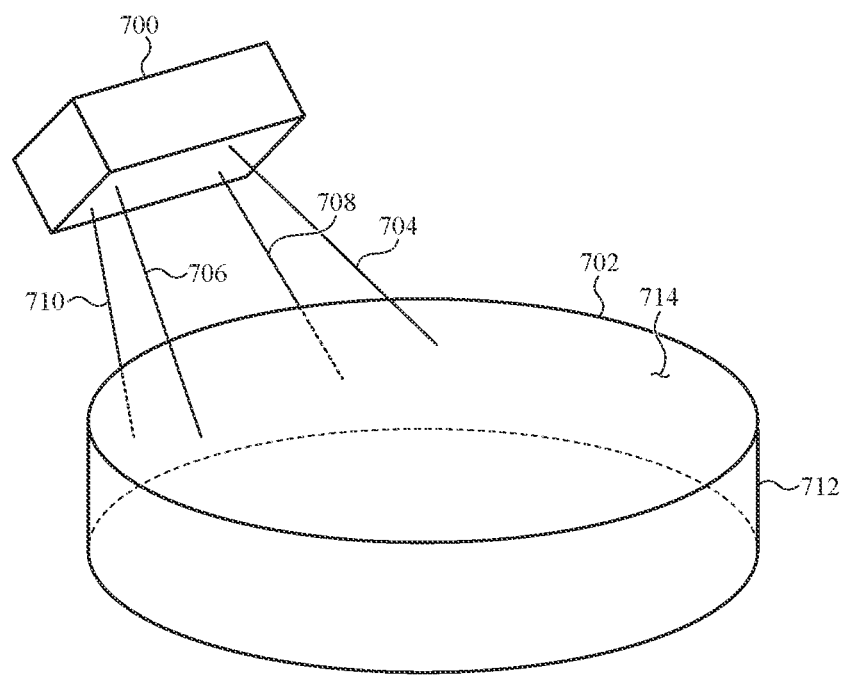
FIG. 7 depicts a perspective view of a portion of another example crown input system with a laser sensing system.

FIGS. 3-6D illustrate laser sensing units emitting laser beams onto only a single surface of the rotor. FIG. 7 illustrates a perspective view of a portion of another crown input system, including a laser sensing unit 700 (which may correspond to or be an embodiment of the laser sensing unit 220) and a rotor 702 (which may correspond to or be an embodiment of the rotor 211), in which the laser sensing unit 700 emits laser beams onto multiple different surfaces of the rotor 702. Because the different surfaces may move differently, relative to the laser sensing unit 700 and the beams 704, 706, 708, and 710, for the same input, directing the beams onto the different surfaces may allow the laser sensing system to detect more varied inputs and/or detect crown inputs with greater accuracy or resolution. As shown in FIG. 7, beams 704, and 706 are directed onto an outer peripheral surface 712 of the rotor 702, and beams 708 and 710 are directed onto a face 714 surface of the rotor 702. In some cases, a face surface of a rotor is substantially planar, and an outer peripheral surface is a curved surface (e.g., geometrically defined by a revolution of a line about an axis that is not perpendicular to the line). In other examples, the outer peripheral surface may be faceted (e.g., a series of flat surfaces defining facets that are not perpendicular to the shaft axis. While FIG. 7 illustrates all of the beams originating from a single laser sensing unit 700, in other examples, the beams may originate from separate laser sensing units.

FIGS. 8 and 9 illustrate example laser sensing units 800, 900, respectively. More particularly, FIG. 8 illustrates a laser sensing unit 800 that includes multiple laser modules 802, 804. The first laser module 802 is configured to emit a laser beam 806 that is directed onto a rotor, and the second laser module 804 is configured to emit a laser beam 808 that is directed onto the rotor, as described above. The laser modules 802, 804 may be VCSEL modules, and may (along with other components such as processing elements) detect rotor motion using self-mixing laser interferometry. The first and second laser modules 802, 804 may be mounted to a substrate 803, such as a chip carrier, circuit board, or the like. The substrate 803 may be coupled to a component 805, which may be a circuit board (e.g., a rigid or flexible circuit board), a base structure, a bracket of an electronic device (e.g., the bracket 216), or the like.

The laser sensing unit 800 also includes a single beam-directing structure 810 positioned over the laser modules (and optionally coupled to the substrate 803). The beam-directing structure 810 may be configured to direct the first laser beam 806 along a first beam path 812, and to direct the second laser beam 808 along a second beam path 814 that is different from the first beam path. The beam-directing structure 810 may be formed from an optically transmissive material, such as glass, a polymer, a crystalline material, or any other suitable material. The beam-directing structure 810 may include or define beam-directing elements, such as lenses, refracting surfaces, reflecting surfaces, beam splitters, prisms, or the like, in order to direct the laser beams along the intended beam paths.

FIG. 9 illustrates a laser sensing unit 900 that includes multiple laser modules 902, 904. The first laser module 902 is configured to emit a laser beam 906 that is directed onto a rotor, and the second laser module 904 is configured to emit a laser beam 908 that is directed onto the rotor, as described above. The laser modules 902, 904 may be VCSEL modules, and may (along with other components such as processing elements) detect rotor motion using self-mixing laser interferometry. The first and second laser modules 902, 904 may be mounted to separate substrates 901, 903 such as chip carriers, circuit boards, or the like. Alternatively, the first and second laser modules 902, 904 may be coupled to a single substrate, as shown in FIG. 8. The substrates 901, 903 may be coupled to a component 905, which may be a circuit board (e.g., a rigid or flexible circuit board), a base structure, a bracket of an electronic device (e.g., the bracket 216), or the like.

The laser sensing unit 900 includes multiple beam-directing structures 910, 911 positioned over the laser modules (and optionally coupled to the substrates 901, 903 respectively). The beam-directing structures 910, 911 may be configured to direct, respectively, the first laser beam 906 along a first beam path 912, and to direct the second laser beam 908 along a second beam path 914 that is different from the first beam path. The beam-directing structures 910, 911 may be formed from an optically transmissive material, such as glass, a polymer, a crystalline material, or any other suitable material. The beam-directing structures 910, 911 may include or define beam-directing elements, such as lenses, refracting surfaces, reflecting surfaces, beam splitters, prisms, or the like, in order to direct the laser beams along the intended beam paths.

In any of the examples described herein, a laser sensing system may determine whether a detected motion of a rotor (or other component of a crown that moves in response to crown inputs) corresponds to an input by comparing one or more parameters of the detected motion (e.g., speed, distance, direction) to one or more threshold conditions. If the threshold condition is satisfied (or the threshold conditions, where multiple parameters are evaluated), the laser sensing system determines that an input has been provided and causes the device to perform a particular action or operation, as described herein. Thus, the laser sensing system can ignore movements that result from unintentional manipulation of the crown (e.g., due to the crown contacting a user's arm or clothing), while still responding appropriately to intentional inputs.

The laser sensing system, and a device more generally, may treat detected movements as binary inputs (e.g., button pushes with an on/off condition) or continuous inputs. In the case of binary inputs, if the parameter of the movement satisfies a threshold condition, the input is considered to be "true," and the device responds accordingly. In the case of continuous inputs, the laser sensing system, or the device more generally, may correlate an operation to an extent of the movement. For example, the extent to which a crown is pushed or pivoted (e.g., the distance of movement) may control a speed of a graphical object on a display (e.g., a scroll speed of a list). In such cases, a greater distance of the crown input may correspond to a higher speed. As another example, the extent to which a crown is pushed or pivoted (e.g., the distance of movement) may control a volume of an audio output or a brightness of a display. Other mappings between the distance produced by an input and an operation of the device are also contemplated.

Figure 10A:
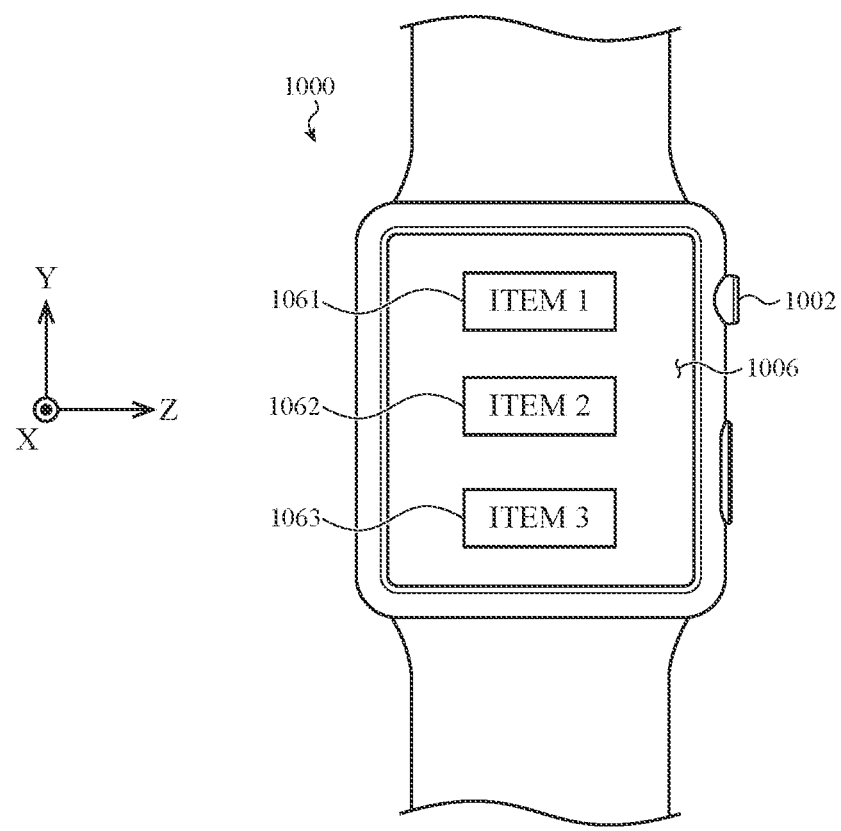
FIGS. 10A-12B depict examples of controlling operations of an electronic device based on inputs provided by force and/or rotational inputs to a crown of the device.

FIG. 10A depicts an example electronic device 1000 (shown here as an electronic watch) having a crown 1002. The crown 1002 may be similar to the examples described above and may receive rotational inputs and translational inputs (also referred to as force inputs) along an axial direction of the crown. A display 1006 provides a graphical output (e.g., shows information and/or other graphics). In some embodiments, the display 1006 may be configured as a touch-sensitive display capable of receiving touch and/or force input. In the current example, the display 1006 depicts a list of various items 1061, 1062, 1063, all of which are example indicia.

Figure 10B:
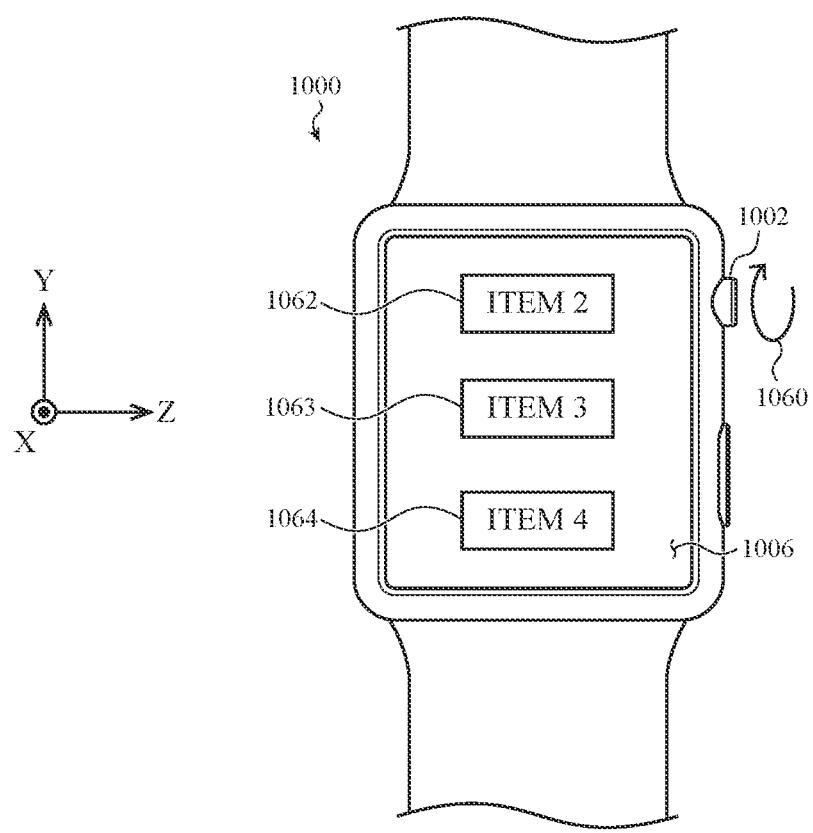

FIG. 10B illustrates how the graphical output shown on the display 1006 changes as the crown 1002 rotates, partially or completely (as indicated by the arrow 1060). Rotating the crown 1002 causes the list to scroll or otherwise move on the screen, such that the first item 1061 is no longer displayed, the second and third items 1062, 1063 each move upwards on the display, and a fourth item 1064 is now shown at the bottom of the display. This is one example of a scrolling operation that can be executed by rotating the crown 1002. Such scrolling operations may provide a simple and efficient way to depict multiple items relatively quickly and in sequential order. A speed of the scrolling operation may be controlled by the amount of rotational force applied to the crown 1002 and/or the speed at which the crown 1002 is rotated. Faster or more forceful rotation may yield faster scrolling, while slower or less forceful rotation yields slower scrolling. The crown 1002 may receive an axial or translational force (e.g., a force inward toward the display 1006 or watch body) to select an item from the list, in certain embodiments.

Figure 11A:
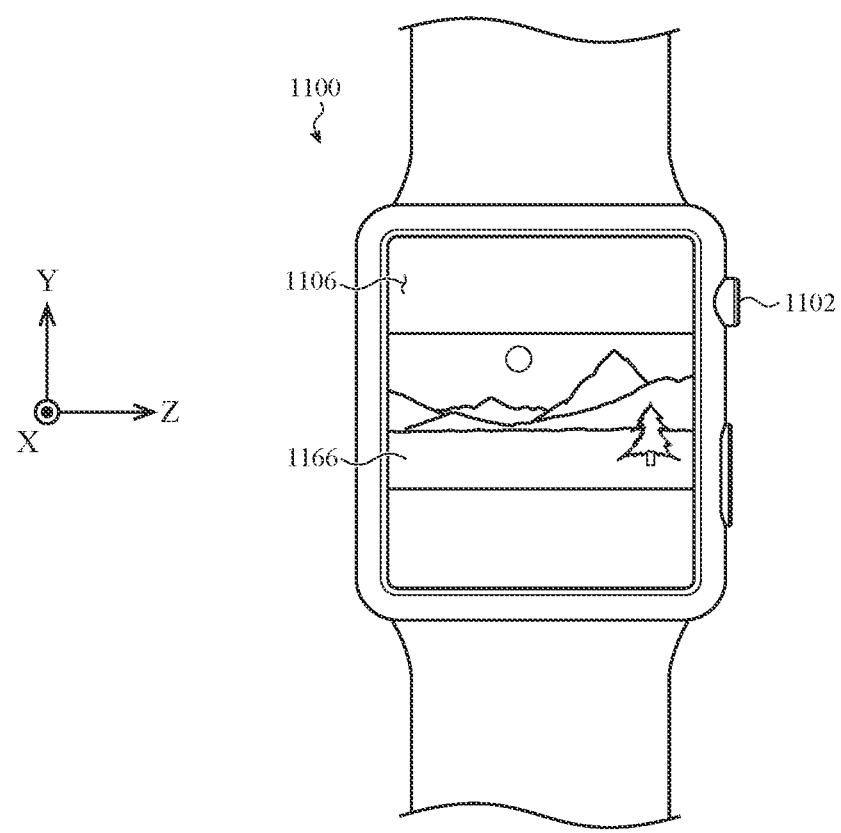
Figure 11B:
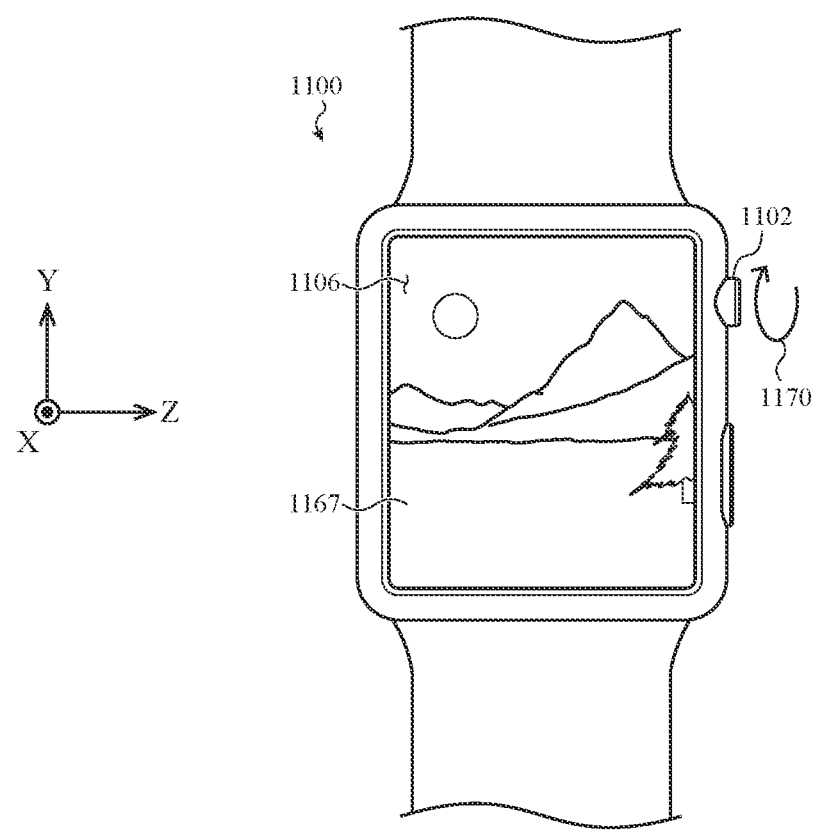

FIGS. 11A and 11B illustrate an example zoom operation. The display 1106 of the device 1100 depicts a picture 1166 at a first magnification, shown in FIG. 11A; the picture 1166 is yet another example of an indicium. As the crown 1102 is rotated (illustrated by arrow 1170), the display may zoom into the picture, such that a portion 1167 of the picture is shown at an increased magnification (shown in FIG. 11B). The direction of zoom (in vs. out) and speed of zoom, or location of zoom, may be controlled through rotation of the crown 1102, and particularly through the direction of rotation and/or speed of rotation. Rotating the crown 1102 in a first direction may zoom in, while rotating the crown in an opposite direction may zoom out. Alternately, rotating the crown in a first direction may change the portion of the picture subject to the zoom effect.

Figure 12A:
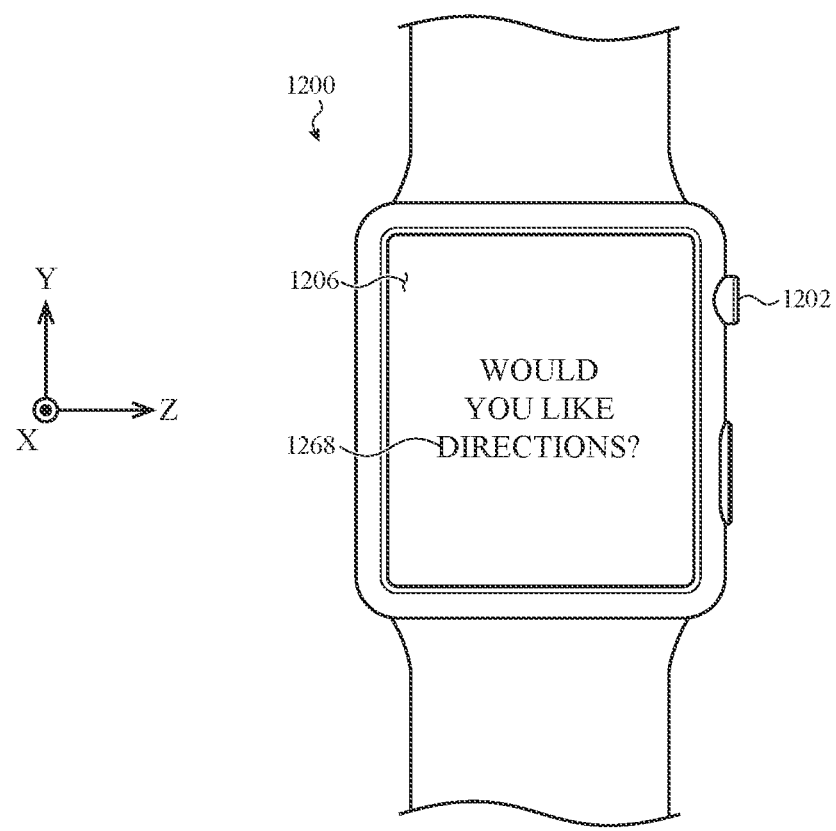
Figure 12B:
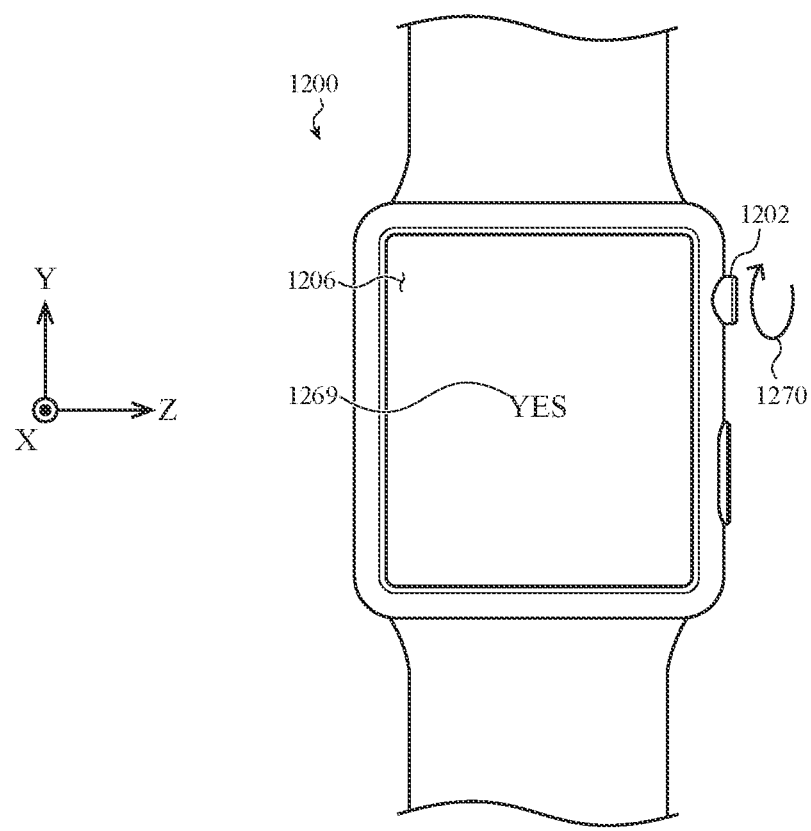

FIGS. 12A and 12B illustrate possible use of the crown 1202 to change an operational state of the electronic device 1200 or otherwise toggle between inputs. Turning first to FIG. 12A, the display 1206 depicts a question 1268, namely, "Would you like directions?" As shown in FIG. 12B, the crown 1202 may be rotated (illustrated by arrow 1270) to answer the question. Rotating the crown provides an input interpreted by the electronic watch 1200 as "yes," and so "YES" is displayed as a graphic 1269 on the display 1206. Rotating the crown 1202 in an opposite direction may provide a "no" input. In the embodiment shown in FIGS. 12A-12B, the crown's rotation is used to directly provide the input, rather than select from options in a list (as discussed above with respect to FIGS. 10A-10B).

As mentioned previously, force (e.g., axial inputs) or rotational input to a crown of an electronic device may control many functions beyond those listed here. The crown may receive distinct force or rotational inputs to adjust a volume of an electronic device, a brightness of a display, or other operational parameters of the device. A force or rotational input applied to the crown may rotate to turn a display on or off, or turn the device on or off. A force or rotational input to the crown may launch or terminate an application on the electronic device. Further, combinations of inputs to the crown may likewise initiate or control any of the foregoing functions, as well.

In some cases, the graphical output of a display may be responsive to inputs applied to a touch-sensitive display in addition to inputs applied to a crown. The touch-sensitive display may include or be associated with one or more touch and/or force sensors that extend along an output region of a display and which may use any suitable sensing elements and/or sensing techniques to detect touch and/or force inputs applied to the touch-sensitive display. The same or similar graphical output manipulations that are produced in response to inputs applied to the crown may also be produced in response to inputs applied to the touch-sensitive display. For example, a swipe gesture applied to the touch-sensitive display may cause the graphical output to move in a direction corresponding to the swipe gesture. As another example, a tap gesture applied to the touch-sensitive display may cause an item to be selected or activated. In this way, a user may have multiple different ways to interact with and control an electronic watch, and in particular the graphical output of an electronic watch. Further, while the crown may provide overlapping functionality with the touch-sensitive display, using the crown allows for the graphical output of the display to be visible (without being blocked by the finger that is providing the touch input).

Figure 13:
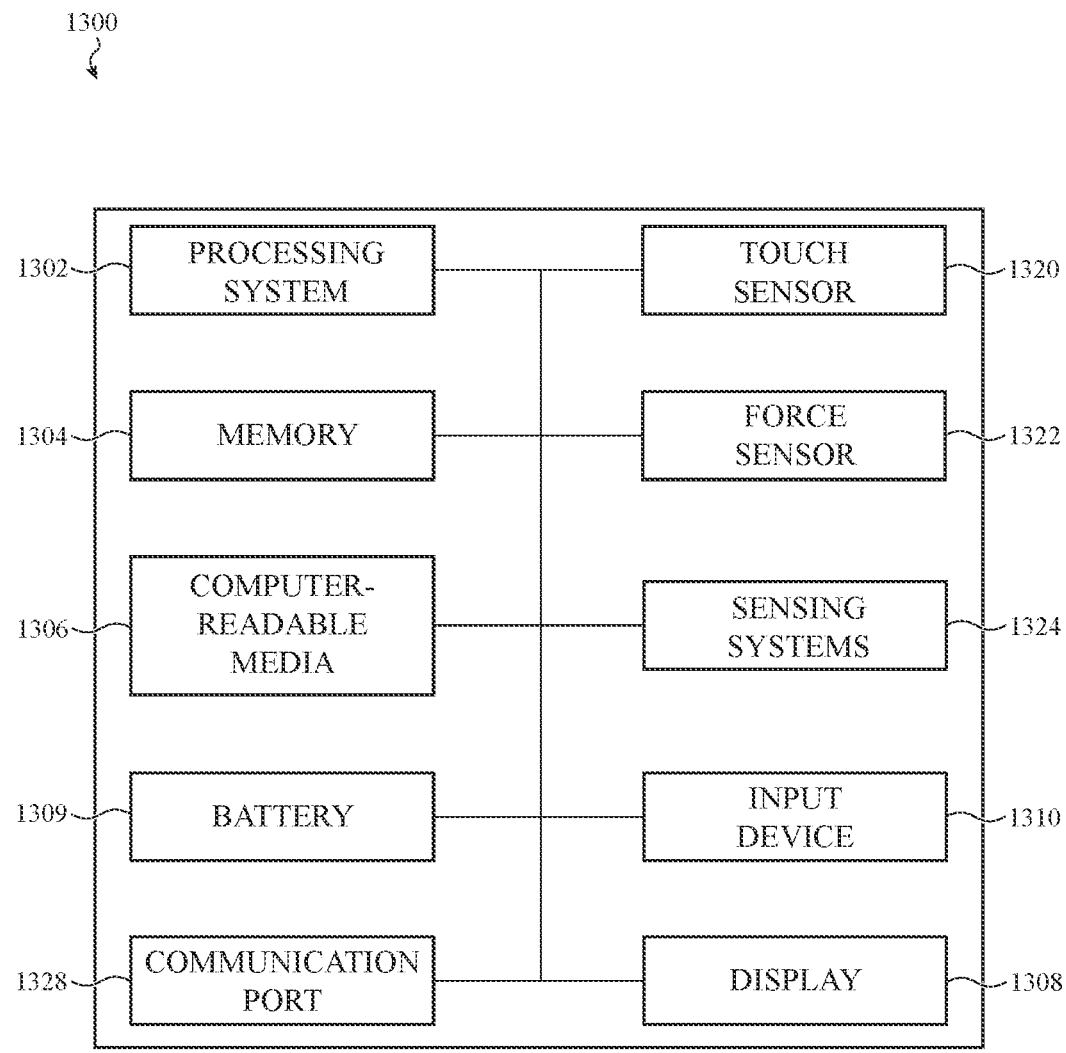
FIG. 13 depicts example components of an electronic device.

FIG. 13 depicts an example schematic diagram of an electronic device 1300. By way of example, the device 1300 of FIG. 13 may correspond to the wearable electronic device 100 shown in FIGS. 1A-1B (or any other wearable electronic device described herein). To the extent that multiple functionalities, operations, and structures are disclosed as being part of, incorporated into, or performed by the device 1300, it should be understood that various embodiments may omit any or all such described functionalities, operations, and structures. Thus, different embodiments of the device 1300 may have some, none, or all of the various capabilities, apparatuses, physical features, modes, and operating parameters discussed herein.

As shown in FIG. 13, a device 1300 includes a processing system 1302 operatively connected to computer memory 1304 and/or computer-readable media 1306. The processing system 1302 may be operatively connected to the memory 1304 and computer-readable media 1306 components via an electronic bus or bridge. The processing system 1302 may include one or more computer processors or microcontrollers that are configured to perform operations in response to computer-readable instructions. The processing system 1302 may include the central processing unit (CPU) of the device. Additionally or alternatively, the processing system 1302 may include other processors within the device including application specific integrated chips (ASIC) and other microcontroller devices.

The memory 1304 may include a variety of types of non-transitory computer-readable storage media, including, for example, read access memory (RAM), read-only memory (ROM), erasable programmable memory (e.g., EPROM and EEPROM), or flash memory. The memory 1304 is configured to store computer-readable instructions, sensor values, and other persistent software elements. Computer-readable media 1306 also includes a variety of types of non-transitory computer-readable storage media including, for example, a hard-drive storage device, a solid-state storage device, a portable magnetic storage device, or other similar device. The computer-readable media 1306 may also be configured to store computer-readable instructions, sensor values, and other persistent software elements.

In this example, the processing system 1302 is operable to read computer-readable instructions stored on the memory 1304 and/or computer-readable media 1306. The computer-readable instructions may adapt the processing system 1302 to perform the operations or functions described herein. In particular, the processing system 1302, the memory 1304, and/or the computer-readable media 1306 may be configured to cooperate with a sensor or sensing system 1324 (e.g., a laser sensing system that detects inputs to a crown, such as rotational inputs, translational inputs, and pivotal inputs) to control the operation of a device in response to an input applied to a crown of a device (e.g., the crown 112 or any other crown described herein). The computer-readable instructions may be provided as a computer-program product, software application, or the like.

As shown in FIG. 13, the device 1300 also includes a display 1308. The display 1308 may include a liquid-crystal display (LCD), organic light emitting diode (OLED) display, light emitting diode (LED) display, or the like. If the display 1308 is an LCD, the display 1308 may also include a backlight component that can be controlled to provide variable levels of display brightness. If the display 1308 is an OLED or LED type display, the brightness of the display 1308 may be controlled by modifying the electrical signals that are provided to display elements. The display 1308 may correspond to any of the displays shown or described herein.

The device 1300 may also include a battery 1309 that is configured to provide electrical power to the components of the device 1300. The battery 1309 may include one or more power storage cells that are linked together to provide an internal supply of electrical power. The battery 1309 may be operatively coupled to power management circuitry that is configured to provide appropriate voltage and power levels for individual components or groups of components within the device 1300. The battery 1309, via power management circuitry, may be configured to receive power from an external source, such as an AC power outlet. The battery 1309 may store received power so that the device 1300 may operate without connection to an external power source for an extended period of time, which may range from several hours to several days.

In some embodiments, the device 1300 includes one or more input devices 1310. An input device 1310 is a device that is configured to receive user input. The one or more input devices 1310 may include, for example, a crown input system (e.g., any of the crowns described herein), a push button, a touch-activated button, a keyboard, a keypad, or the like (including any combination of these or other components). In some embodiments, the input device 1310 may provide a dedicated or primary function, including, for example, a power button, volume buttons, home buttons, scroll wheels, and camera buttons.

The device 1300 may also include one or more sensing systems 1324. The sensing systems 1324 may detect inputs provided by a user to a crown of the device (e.g., the crown 112 or any other crown described herein). The sensing systems 1324 may include sensing circuitry and other sensing components that facilitate sensing any of rotational motion, translational motion, or pivotal motion of a crown. The sensing systems 1324 may include components such as a laser sensing unit (including laser modules), a tactile or dome switch, or any other suitable components or sensors that may be used to provide the sensing functions described herein. The sensing systems 1324 may also include a biometric sensor, such as a heart rate sensor, electrocardiograph sensor, temperature sensor, or any other sensor that conductively couples to the user and/or to the external environment through a crown input system, as described herein. In cases where the sensing systems 1324 include a biometric sensor, it may include biometric sensing circuitry, as well as portions of a crown that conductively couple a user's body to the biometric sensing circuitry. Biometric sensing circuitry may include components such as processors, capacitors, inductors, transistors, analog-to-digital converters, or the like.

The device 1300 may also include a touch sensor 1320 that is configured to determine a location of a touch on a touch-sensitive surface of the device 1300 (e.g., an input surface defined by the portion of a cover 108 over a display 109). The touch sensor 1320 may use or include capacitive sensors, resistive sensors, surface acoustic wave sensors, piezoelectric sensors, strain gauges, or the like. In some cases, the touch sensor 1320 associated with a touch-sensitive surface of the device 1300 may include a capacitive array of electrodes or nodes that operate in accordance with a mutual-capacitance or self-capacitance scheme. The touch sensor 1320 may be integrated with one or more layers of a display stack (e.g., the display 109) to provide the touch-sensing functionality of a touchscreen. Moreover, the touch sensor 1320, or a portion thereof, may be used to sense motion of a user's finger as it slides along a surface of a crown, as described herein.

The device 1300 may also include a force sensor 1322 that is configured to receive and/or detect force inputs applied to a user input surface of the device 1300 (e.g., the display 109). The force sensor 1322 may use or include capacitive sensors, resistive sensors, surface acoustic wave sensors, piezoelectric sensors, strain gauges, or the like. In some cases, the force sensor 1322 may include or be coupled to capacitive sensing elements that facilitate the detection of changes in relative positions of the components of the force sensor (e.g., deflections caused by a force input). The force sensor 1322 may be integrated with one or more layers of a display stack (e.g., the display 109) to provide force-sensing functionality of a touchscreen. The force sensor 1322 may also correspond to the force sensing element and associated circuitry in FIG. 9.

The device 1300 may also include a communication port 1328 that is configured to transmit and/or receive signals or electrical communication from an external or separate device. The communication port 1328 may be configured to couple to an external device via a cable, adaptor, or other type of electrical connector. In some embodiments, the communication port 1328 may be used to couple the device 1300 to an accessory, including a dock or case, a stylus or other input device, smart cover, smart stand, keyboard, or other device configured to send and/or receive electrical signals.

As described above, one aspect of the present technology is the gathering and use of data from a user. The present disclosure contemplates that in some instances this gathered data may include personal information data that uniquely identifies or can be used to contact or locate a specific person. Such personal information data can include demographic data, location-based data, telephone numbers, email addresses, twitter IDs (or other social media aliases or handles), home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide haptic or audiovisual outputs that are tailored to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act ("HIPAA"); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of determining spatial parameters, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, haptic outputs may be provided based on non-personal information data or a bare minimum amount of personal information, such as events or states at the device associated with a user, other non-personal information, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. An electronic watch comprising:
   a housing defining a side wall;
   a display;
   a front cover positioned over the display;
   an input system configured to receive a rotational input and a translational input and comprising:
      a crown comprising:
         a knob external to the housing; and
         a rotor coupled to the knob and configured to rotate in response to the rotational input and translate in response to the translational input;
      a first laser module configured to direct a first laser beam onto the rotor and receive a first reflected light from the rotor; and a second laser module configured to direct a second laser beam onto the rotor and receive a second reflected light from the rotor; and a processing system coupled to the first laser module and the second laser module and configured to determine:
   a parameter of the rotational input based at least in part on a first information from the first laser module and a second information from the second laser module; and
   a parameter of the translational input based at least in part on a third information from the first laser module and a fourth information from the second laser module.

2. The electronic watch of claim 1, wherein:
the input system is further configured to receive a pivotal input; and
the processing system is further configured to determine a parameter of the pivotal input based at least in part on a fifth information from the first laser module and a sixth information from the second laser module.

3. The electronic watch of claim 1, wherein:
the first laser beam has a first angle of incidence on the rotor; and
the second laser beam has a second angle of incidence on the rotor, the second angle of incidence different than the first angle of incidence.

4. The electronic watch of claim 1, wherein:
the first laser beam has a first angle of incidence on the rotor; and
the second laser beam has a second angle of incidence on the rotor, the second angle of incidence equal to the first angle of incidence.

5. The electronic watch of claim 1, wherein:
the electronic watch further includes biometric sensing circuitry;
the crown further comprises a conductive shaft conductively coupling the knob to the biometric sensing circuitry; and
the biometric sensing circuitry determines biometric information of a user based at least in part on a voltage detected at the knob.

6. The electronic watch of claim 1, wherein the first information from the first laser module is based at least in part on an interference between the first laser beam and the first reflected light.

7. The electronic watch of claim 1, further comprising a beam-directing structure positioned over the first laser module and the second laser module and configured to direct the first laser beam along a first beam path and to direct the second laser beam along a second beam path different from the first beam path.

8. A wearable electronic device comprising:
a housing having a side wall;
a crown comprising:
   a shaft assembly extending along a shaft axis;
   a knob coupled to the shaft assembly and defining:
      an axial end surface; and
      a peripheral surface extending about the axial end surface and configured to receive:
         a rotational input that results in a rotation of the crown; and
         a radial input that results in a pivot of the crown about a shaft pivot; and
   a rotor coupled to the shaft assembly;
a first laser module configured to direct a first laser beam onto the rotor and receive a first reflected light from the rotor;

a second laser module configured to direct a second laser beam onto the rotor and receive a second reflected light from the rotor; and a processing system coupled to the first laser module and the second laser module and configured to determine:
   a parameter of the rotation of the crown; and
   a parameter of the pivot of the crown.

9. The wearable electronic device of claim 8, wherein:
the shaft assembly extends into the housing through a hole; and
the wearable electronic device further comprises a sealing member positioned between the shaft assembly and a surface of the hole.

10. The wearable electronic device of claim 9, wherein the sealing member defines the shaft pivot.

11. The wearable electronic device of claim 8, wherein:
the rotor defines an outer peripheral surface;
the first laser beam is incident at a first location of the outer peripheral surface; and
the second laser beam is incident at a second location of the outer peripheral surface different from the first location.

12. The wearable electronic device of claim 11, wherein the outer peripheral surface is conical.

13. The wearable electronic device of claim 8, wherein:
the axial end surface is configured to receive an axial input that results in a translation of the crown; and
the processing system is further configured to determine a parameter of the translation of the crown.

14. The wearable electronic device of claim 13, wherein the processing system is configured to determine the parameter of the translation of the crown based at least in part on information from at least one of the first laser module or the second laser module.

15. The wearable electronic device of claim 8, wherein the first laser beam is parallel to the second laser beam.

16. An electronic watch comprising:
a housing;
a crown configured to receive a rotational input and a translational input and comprising:
   a knob positioned along a side of the housing; and
   a rotor coupled to the knob and defining a sensing surface;
a first laser module configured to direct a first laser beam onto the rotor and configured to receive a first reflected light from the rotor;
a second laser module configured to direct a second laser beam onto the rotor and receive a second reflected light from the rotor, the second laser beam non-parallel with the first laser beam; and
a processing system coupled to the first laser module and the second laser module and configured to determine:
   a parameter of the rotational input based at least in part on a first interference between the first laser beam and the first reflected light and a second interference between the second laser beam and the second reflected light; and
   a parameter of the translational input based at least in part on a third interference between the first laser beam and the first reflected light and a fourth interference between the second laser beam and the second reflected light.

17. The electronic watch of claim 16, wherein:
the first laser beam has a first angle of incidence on the rotor; and the second laser beam has a second angle of incidence on the rotor, the second angle of incidence equal to the first angle of incidence.

18. The electronic watch of claim 17, wherein:

the first laser beam is incident on the rotor at a first radial distance from a rotational axis of the rotor; and the second laser beam is incident on the rotor at a second radial distance from the rotational axis of the rotor, the second radial distance equal to the first radial distance.

19. The electronic watch of claim 16, wherein:

the rotational input has a rotation direction; and for the rotational input having the rotation direction:
- the first interference between the first laser beam and the first reflected light indicates a movement having a first speed and a first direction; and
- the second interference between the second laser beam and the second reflected light indicates a movement having a second speed equal to the first speed and a second direction different from the first direction.

20. The electronic watch of claim 16, wherein:

the electronic watch further includes biometric sensing circuitry;

the crown further comprises a conductive shaft conductively coupling the knob to the biometric sensing circuitry; and the biometric sensing circuitry determines biometric information of a user based at least in part on a voltage detected at the knob.

\* \* \* \* \*